United States Patent
Alloin

(10) Patent No.: US 9,966,995 B1
(45) Date of Patent: May 8, 2018

(54) DIGITAL SUBSCRIBER LINE INTERFERENCE MEASUREMENTS AND POWER LINE COMMUNICATION BEAMFORMING OPTIMIZATION

(71) Applicant: QUALCOMM Incorporated, San Diego, CA (US)

(72) Inventor: Laurent Alloin, Monmouth Beach, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/296,473

(22) Filed: Oct. 18, 2016

(51) Int. Cl.
  H04L 25/00 (2006.01)
  H04B 3/54 (2006.01)
  H04M 11/06 (2006.01)
  H04M 3/18 (2006.01)
  H04B 7/0426 (2017.01)
  H04B 3/56 (2006.01)

(52) U.S. Cl.
  CPC .............. H04B 3/542 (2013.01); H04B 3/56 (2013.01); H04B 7/0426 (2013.01); H04M 3/18 (2013.01); H04M 11/062 (2013.01)

(58) Field of Classification Search
  CPC ........ H04B 1/0475; H04B 3/46; H04B 3/487; G06F 1/324; G06F 1/3287; H06F 1/3212
  USPC ....... 375/257, 222, 224, 346; 379/1.01, 1.03
  See application file for complete search history.

(56) References Cited

U.S. PATENT DOCUMENTS

| 6,959,056 B2 * | 10/2005 | Yeap | G10L 21/0208 375/346 |
| 2011/0268258 A1 * | 11/2011 | Alloin | H04M 3/2209 379/32.04 |

(Continued)

FOREIGN PATENT DOCUMENTS

WO WO-2014062967 A1 4/2014
WO WO-2015144538 A1 10/2015

OTHER PUBLICATIONS

ISA/EP International Search Report and Written Opinion of the International Searching Authority, Int'l Application No. PCT/US2017/056631, Jan. 2, 2018, European Patent Office, Rijswijk, NL, 17 pgs.

(Continued)

*Primary Examiner* — Khai Tran
(74) *Attorney, Agent, or Firm* — Holland & Hart LLP/Qualcomm

(57) ABSTRACT

This disclosure provides systems, methods, and apparatus for wireline communication. Independent control of probing signals transmitted on different power line couplings may be used to characterize power line communication (PLC) signal leakage on a set of digital subscriber line (DSL) lines. For example, PLC packets may be sent on a primary coupling and an alternate coupling, and PLC signal leakage from these couplings may be measured by a device, such as a PLC device or a DSL device, connected to the set of DSL lines. The measurements from each coupling may enable a determination as to which of the couplings (either primary or alternate) is more imbalanced and results in relatively more PLC signal leakage into the set of DSL lines. Accordingly, a transmission power and a precoder may be determined based on the measured PLC signal leakage to mitigate interference on the twisted pair.

28 Claims, 15 Drawing Sheets

(56) References Cited

U.S. PATENT DOCUMENTS

| | | |
|---|---|---|
| 2014/0112379 A1* | 4/2014 | Biyani ................. H04B 1/1036 375/222 |
| 2015/0009793 A1 | 1/2015 | Schwager et al. |
| 2015/0365256 A1 | 12/2015 | Afkhami et al. |
| 2017/0295044 A1 | 10/2017 | Oksman |

OTHER PUBLICATIONS

Metanoia Technologies Inc. et al., "G.hn, G.vdsl, G.fast: Powerline Interference Indication and Mitigation for DSL Transceivers," Telecommunication Standardization Sector, Jul. 2013, 16 pgs., COM 15-C 0175-E, XP017586609, international Telecommunication Union.

* cited by examiner

DIGITAL SUBSCRIBER LINE INTERFERENCE MEASUREMENTS AND POWER LINE COMMUNICATION BEAMFORMING OPTIMIZATION

TECHNICAL FIELD

The following relates generally to wireline communications, and more specifically to digital subscriber line (DSL) interference measurements and power line communication (PLC) beamforming optimization.

DESCRIPTION OF THE RELATED TECHNOLOGY

The rapid growth of the Internet and the content available through the Internet has increased the demand for high bandwidth connectivity. Digital subscriber line (DSL or xDSL) technology meets this demand by providing data service over twisted pair telephone lines. DSL can be deployed from central offices (COs), from fiber-fed cabinets located near the customer premises, or within buildings. DSL systems typically include multiple bundles of twisted pair wires located within close proximity to each other. In some cases, signals on the twisted pair may be impacted by other wireline communications systems, such as PLC systems. PLC systems utilize electrical wiring within a building as network cables to carry communications between PLC devices. For instance, power lines may be used to transmit and receive modulated data between PLC-capable devices that are connected to the power lines. However, the PLC signals carried on the power lines may create electromagnetic interference, resulting in impulse noise received on the twisted pair of a collocated DSL system, thereby disrupting communications in the DSL system.

In some cases, impulse noise received on the twisted pair may be measured, and the measurements may be provided to an arbiter in communication with one or more PLC devices. The arbiter may attempt to mitigate the impact of transmissions from the PLC devices onto the DSL twisted pair for mutual optimization of the two communications systems. As a result, communications efficiency of DSL and PLC systems may benefit from devices capable of coherently detecting impulse noise on DSL lines and techniques that enhance interoperability and improve impulse noise measurements.

SUMMARY

A PLC device for wireline communications is described. The PLC device may include a set of PLC receivers coupled to a set of power lines, at least one sensor coupled to a DSL line, where the at least one sensor may be configured to detect PLC signal leakage on the DSL line, and a PLC transmitter configured to adjust a transmission power or a precoder based at least in part on the detected PLC signal leakage.

In some examples of the PLC device described above, the at least one sensor comprises a common mode (CM) port or a differential mode (DM) port. In some examples of the PLC device described above, the PLC signal leakage is detected on one or both of the CM port or the DM port. In some examples of the PLC device described above, a PLC receiver of the set of PLC receivers comprises: a CM sensor configured to coherently detect a CM signal with the at least one sensor, a DM sensor configured to coherently detect a DM signal with the at least on sensor, or both.

In some examples of the PLC device described above, the PLC signal leakage comprises a first PLC signal leakage and a second PLC signal leakage, where the first PLC signal leakage corresponds to a primary coupling between a phase power line and a neutral power line, and the second PLC signal leakage corresponds to an alternate coupling between the phase power line and a protective earth power line. In some examples of the PLC device described above, the PLC receiver is further configured to transmit the detected PLC signal leakage to an arbiter.

In some examples of the PLC device described above, the PLC device may further include a decoder to decode one or more PLC sound packets transmitted on the set of power lines. In some examples of the PLC device described above, the PLC signal leakage is detected based at least in part on one or more PLC sound packets transmitted on the set of power lines. In some examples of the PLC device described above, the precoder is used for multiple-input multiple-output (MIMO) communications on the set of power lines.

In some examples of the PLC device described above, the precoder is configured to minimize PLC signal leakage from at least one PLC device, where the at least one PLC device comprises the PLC device, another PLC device coupled to the set of power lines, or both. In some examples of the PLC device described above, the precoder is configured to maximize PLC signal leakage from at least one PLC device, where the at least one PLC device comprises the PLC device, another PLC device coupled to the set of power lines, or both.

An apparatus for wireline communications is described. The apparatus may include a processor, memory in electronic communication with the processor, and instructions stored in the memory. The instructions may be operable to cause the processor to determine impulse noise on a set of DSL lines, wherein the impulse noise comprises one or more PLC packets transmitted by a PLC device, determine a first PLC signal leakage corresponding to a primary coupling between a phase power line and a neutral power line and a second PLC signal leakage corresponding to an alternate coupling between the phase power line and a protective earth power line based at least in part on the one or more PLC packets, and configure, based at least in part on the first PLC signal leakage and the second PLC signal leakage, a transmission power or a precoder of the PLC device.

A method of wireline communications is described. The method may include determining impulse noise on a set of DSL lines, wherein the impulse noise comprises one or more PLC packets transmitted by a PLC device, determining a first PLC signal leakage corresponding to a primary coupling between a phase power line and a neutral power line and a second PLC signal leakage corresponding to an alternate coupling between the phase power line and a protective earth power line based at least in part on the one or more PLC packets, and configuring, based at least in part on the first PLC signal leakage and the second PLC signal leakage, a transmission power or a precoder of the PLC device.

Another apparatus for wireline communications is described. The apparatus may include means for determining impulse noise on a set of DSL lines, wherein the impulse noise comprises one or more PLC packets transmitted by a PLC device, means for determining a first PLC signal leakage corresponding to a primary coupling between a phase power line and a neutral power line and a second PLC signal leakage corresponding to an alternate coupling between the phase power line and a protective earth power line based at least in part on the one or more PLC packets, and means for configuring, based at least in part on the first PLC signal leakage and the second PLC signal leakage, a transmission power or a precoder of the PLC device.

A non-transitory computer readable medium for wireline communications is described. The non-transitory computer-readable medium may include instructions operable to cause a processor to determine impulse noise on a set of DSL lines, wherein the impulse noise comprises one or more PLC packets transmitted by a PLC device, determine a first PLC signal leakage corresponding to a primary coupling between a phase power line and a neutral power line and a second PLC signal leakage corresponding to an alternate coupling between the phase power line and a protective earth power line based at least in part on the one or more PLC packets, and configure, based at least in part on the first PLC signal leakage and the second PLC signal leakage, a transmission power or a precoder of the PLC device.

Some examples of the method, apparatus, and non-transitory computer-readable medium described above may further include processes, features, means, or instructions for identifying the one or more PLC packets as corresponding to the primary coupling, the alternate coupling, or both. Some examples of the method, apparatus, and non-transitory computer-readable medium described above may further include processes, features, means, or instructions for transmitting an indication to the PLC device of whether to use the primary coupling, the alternate coupling, or both for transmitting the one or more PLC packets. Some examples of the method, apparatus, and non-transitory computer-readable medium described above may further include processes, features, means, or instructions for determining whether precoding may be used by the PLC device on the primary coupling and the alternate coupling to transmit the one or more PLC packets.

Some examples of the method, apparatus, and non-transitory computer-readable medium described above may further include processes, features, means, or instructions for transmitting an indication to the PLC device of whether to use precoding to transmit the one or more PLC packets. In some examples of the method, apparatus, and non-transitory computer-readable medium described above, determining the impulse noise on the set of DSL lines comprises measuring the impulse noise on the set of DSL lines at a DSL device separate from the PLC device.

In some examples of the method, apparatus, and non-transitory computer-readable medium described above, the DSL device may be a dual sensor DSL receiver comprising a CM port and a DM port, and wherein the impulse noise may be detected using the CM port, the DM port, or both. In some examples of the method, apparatus, and non-transitory computer-readable medium described above, determining the impulse noise on the set of DSL lines comprises receiving an indication of the impulse noise from a DSL device separate from the PLC device. In some examples of the method, apparatus, and non-transitory computer-readable medium described above, determining the impulse noise on the set of DSL lines comprises measuring the impulse noise over at least one twisted pair coupled with the PLC device.

In some examples of the method, apparatus, and non-transitory computer-readable medium described above, determining the first PLC signal leakage and the second PLC signal leakage comprises sampling one or more PLC packets. Some examples of the method, apparatus, and non-transitory computer-readable medium described above may further include processes, features, means, or instructions for measuring a phase and amplitude relationship for the primary coupling and the secondary coupling based on the sampled one or more PLC packets.

In some examples of the method, apparatus, and non-transitory computer-readable medium described above, determining the first PLC signal leakage and the second PLC signal leakage comprises decoding one or more PLC packets. Some examples of the method, apparatus, and non-transitory computer-readable medium described above may further include processes, features, means, or instructions for determining one or more parameters for modifying the precoder based on the decoding. Some examples of the method, apparatus, and non-transitory computer-readable medium described above may further include processes, features, means, or instructions for transmitting the determined one or more parameters to the PLC device. In some examples of the method, apparatus, and non-transitory computer-readable medium described above, the precoder may be from a group consisting of a precoder used for single-input single-output (SISO) communication between a first PLC device and a second PLC device and a precoder used for MIMO communication between the first PLC device and the second PLC device.

Some examples of the method, apparatus, and non-transitory computer-readable medium described above may further include processes, features, means, or instructions for determining, at a frequency, a minimum power associated with the first PLC signal leakage and the second PLC signal leakage. Some examples of the method, apparatus, and non-transitory computer-readable medium described above may further include processes, features, means, or instructions for selecting the precoder used for SISO communication or the precoder used for MIMO communication based at least in part on the determined minimum power. In some examples of the method, apparatus, and non-transitory computer-readable medium described above, determining PLC leakage corresponding to the primary coupling and the alternate coupling comprises identifying respective transfer functions for the primary coupling and the secondary coupling.

In some examples of the method, apparatus, and non-transitory computer-readable medium described above, configuring the transmission power of the PLC device comprises setting an equal power backoff of the primary coupling and the alternate coupling or setting a first power backoff of the primary coupling and a second power backoff of the alternate coupling. In some examples of the method, apparatus, and non-transitory computer-readable medium described above, configuring the transmission power of the PLC device comprises setting a frequency-specific power backoff of the primary coupling and the alternate coupling. In some examples of the method, apparatus, and non-transitory computer-readable medium described above, the one or more PLC packets comprise PLC sound packets.

Some examples of the method, apparatus, and non-transitory computer-readable medium described above may further include processes, features, means, or instructions for detecting a CM signal using a CM sensor and at least one sensor coupled to the set of DSL lines, a DM signal using a DM sensor with the at least one sensor coupled to the set of DSL lines, or both. Some examples of the method, apparatus, and non-transitory computer-readable medium described above may further include processes, features, means, or instructions for transmitting, to an arbiter, the first signal leakage, the second signal leakage, or both. Some examples of the method, apparatus, and non-transitory computer-readable medium described above may further include processes, features, means, or instructions for configuring the precoder to minimize PLC signal leakage from at least one PLC device or maximize PLC signal leakage from the at least one PLC device, wherein the at least one PLC device comprises a PLC device coupled to a set of power lines, a PLC device coupled to the set of DSL lines, or both.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
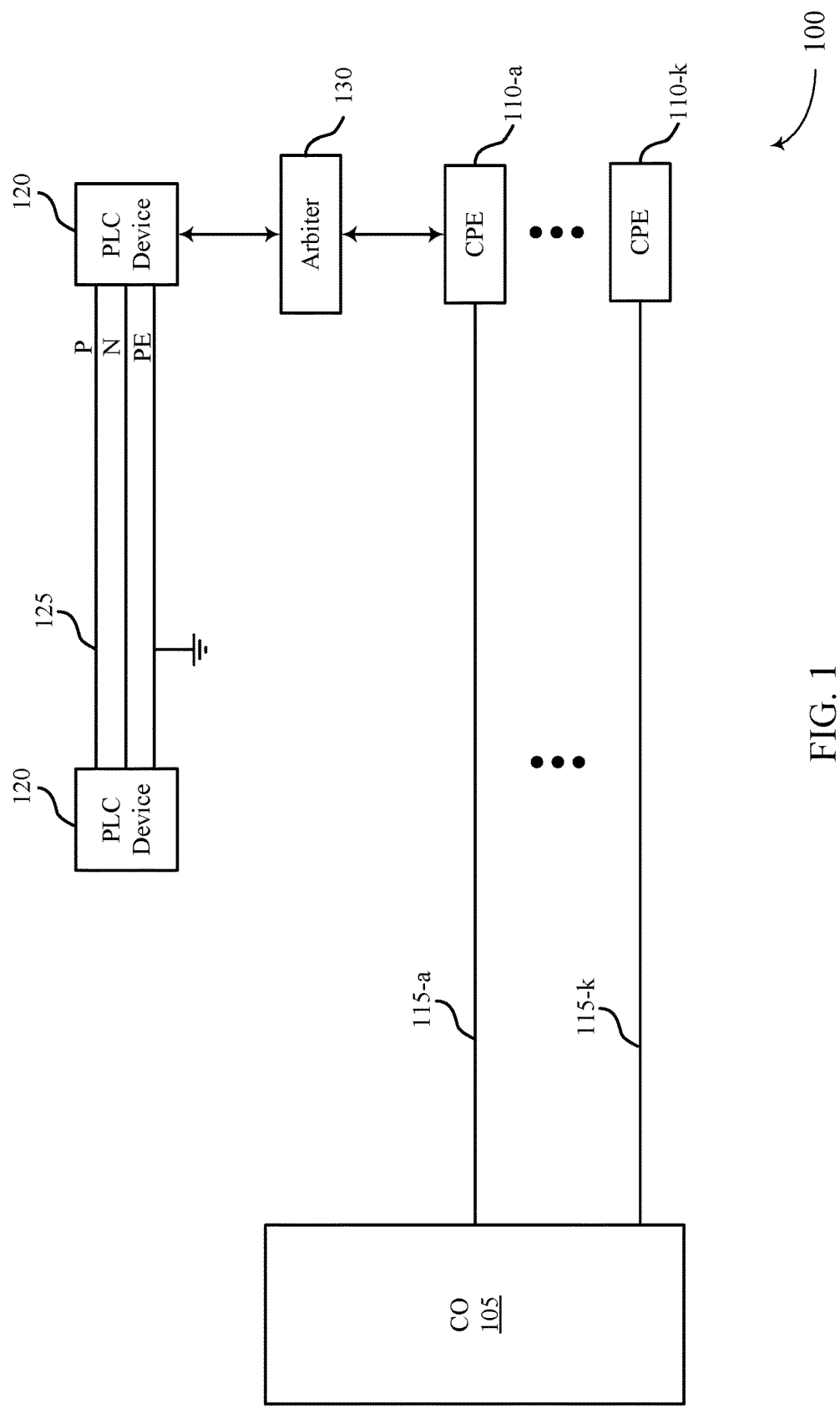
FIG. 1 illustrates an example of collocated wireline communications systems that support digital subscriber line (DSL) interference measurements and power line communication (PLC) beamforming optimization.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving wireline signals according to any of the ITU-T standards and recommendations, or any of the HPAV standards, or other known signals that are used to communicate within a wireline network.

The described techniques relate to methods, systems, devices or apparatuses that support digital subscriber line (DSL) interference measurements and power line communication (PLC) beamforming optimization. Generally, the described techniques provide for detection of PLC signal leakage on a set of DSL lines, where the signal leakage corresponds to PLC packets (such as PLC sound packets) transmitted on a primary coupling and an alternate coupling. For example, a device (such as a customer premises equipment (CPE), a PLC device coupled to the set of DSL lines, or an arbiter (either located separate from a CPE or embedded within a CPE)), may determine impulse noise on a set of DSL lines, where the impulse noise includes PLC packets transmitted by a PLC device. The device may then determine PLC signal leakage that corresponds to PLC packets transmitted on a primary coupling (such as a coupling between a phase power line and a neutral power line) and an alternate coupling (such as a coupling between the phase power line and a protective earth power line). Based on the determined PLC signal leakage on the primary and alternate couplings, the device may then configure a transmission power or a precoder used by the PLC device.

Independent control of probing signals transmitted on different power line couplings may be used to characterize PLC signal leakage into a set of DSL lines. For example, PLC packets may be sent on a primary coupling (such as a coupling between a phase (P) line and a protected earth (PE) line, referred to as P-PE) and an alternate coupling (such as a coupling between the P and neutral (N) line, referred to as P-N), and PLC signal leakage from these couplings may be measured by a device connected to the DSL lines, such as CPE, an arbiter, etc. The measurements from the couplings may enable a determination as to which coupling network (either primary or alternate) is more imbalanced and results in relatively more PLC signal leakage into the set of DSL lines. Accordingly, a transmission power and a precoder to be used by a PLC device may be determined by the device based on the measured PLC signal leakage, where the determined transmission power and the precoder may reduce the PLC signal leakage.

In some examples, a precoding scheme being used by PLC devices may be taken into account when determining PLC signal leakage into the set of DSL lines. For example, PLC devices may use different precoder matrices when communicating on the primary and alternate couplings. Accordingly, multiple measurements may be taken to determine which PLC transmission configuration (such as single-input single-output (SISO) modulation, spot beamforming, multiple-input multiple-output (MIMO) modulation, Eigen beamforming, etc.) produces a greater amount of PLC signal leakage into the set of DSL lines. Additionally, the frequency at which the PLC signal leakage occurs may be determined from these measurements.

As mentioned above, a precoder used by a PLC device may be determined based on the PLC signal leakage into the set of DSL lines. For instance, measurements may be taken to characterize an impact of a precoder on the PLC signal leakage, and a determination of the PLC signal leakage may be used to determine a different precoder (such as a precoder used for modified spot beamforming schemes, which may be referred to as blind spot beamforming) that reduces PLC signal leakage at every frequency. In some cases, an iterative optimization process to determine the precoder may be used to minimize PLC signal leakage into the set of DSL lines.

Transmission power cutbacks may be made to primary and alternate couplings to reduce PLC signal leakage into DSL lines. For example, power cutbacks applied to PLC transmissions may be determined based on a first PLC signal leakage associated with the primary coupling and a second PLC signal leakage associated with the alternate coupling. In some cases, identical power cutbacks may be made across the primary and alternate couplings, or different power cutbacks may be made for each coupling. In either case, the power cutbacks may reduce the PLC signal leakage contributions of the couplings by a certain amount dependent on the relative PLC signal leakage produced by the respective couplings.

The described techniques further relate to multi-sensor PLC devices. For example, a PLC device may include a set of PLC receivers coupled with a set of power lines, at least one sensor coupled to a DSL line, and a PLC transmitter configured to adjust a transmission power or a precoder. In some cases, the at least one sensor may be configured to detect PLC signal leakage on the DSL line, and the PLC transmitter may adjust the transmission power or the precoder based on the detected PLC signal leakage.

One or more sensors of a PLC device may be connected to a DSL twisted pair. These sensors may be coupled with a differential mode (DM) termination of the twisted pair, a common mode (CM) termination of the twisted pair (with respect to a local ground of the PLC device), or both. Accordingly, PLC signal leakage from a PLC network into the DSL twisted pair may be detected and measured by the PLC device.

A coherent channel characterization of the PLC signal leakage into the twisted pair may be performed for one or more transmitted probe signals from any PLC devices within a PLC network. Based on this characterization, an arbiter (also referred to as an arbiter function (AF)) may derive a modified precoder and communicate the modified precoder to each PLC device. Through the application of the modified precoder, the impact of PLC leakage on the twisted pair may be reduced.

In some cases, the DSL receiver inputs attached to the twisted pair may be used for MIMO processing gain of a PLC device. For example, access to CM and DM signals on the DSL lines by the PLC device may provide for additional degrees of freedom to a PLC device using spatial diversity for communication. That is, MIMO transmission schemes in a PLC network may be expanded using the receiver inputs attached to the DSL lines.

Particular implementations of the subject matter described in this disclosure can be implemented to realize one or more of the following potential advantages. A PLC packet may be used to efficiently characterize signal leakage from PLC devices into a twisted pair, enabling measurement of signal leakage on a set of DSL lines. Independent measurements may be completed to identify PLC signal leakage from primary and alternate couplings, which may be used to refine the transmissions on the primary and alternate couplings by PLC devices and enhance coexistence between DSL and PLC communications systems. Additionally, spatial diversity used by transmitting PLC devices (such as beamforming techniques) may reduce the amount of signal leakage of primary and alternate couplings into the set of DSL lines.

Additionally, degrees of freedom associated with a PLC device transmitting signals in a MIMO configuration may be used to mitigate the impact of the PLC leakage onto the set of DSL lines. For example, a selection of which precoder coefficient applied at each frequency may be determined based on a tradeoff between reducing an impact of PLC leakage onto a CPE and reducing the PLC channel capacity. A scenario may be devised that minimizes the PLC leakage affecting a CPE at each frequency without significantly compromising MIMO channel capacity in the PLC network. As a result, a precoder setting at each frequency may be derived that may maximize the PLC channel capacity or minimize leakage of the PLC signal into the set of DSL lines, or performs a combination thereof. Additionally, a combination of precoder modification to support blind spot beamforming and regular power reduction on data streams in MIMO may be used, as the precoder modification and power reduction may not be mutually exclusive, and may be used to achieve a coexistence mitigation scheme for PLC and DSL networks.

A PLC device that has direct access to the DSL medium via the set of DSL lines may facilitate direct measurements of all paths of PLC signal leakage from the powerline network into the twisted pair, and vice versa. Thus, the PLC device may achieve a proper characterization of all PLC signal coupling paths between PLC and DSL networks, which may enable enhanced mitigation of PLC signal leakage into a set of DSL lines. Moreover, a coherent demodulation of the leaked PLC signal into the set of DSL lines by a PLC device connected to the twisted pair may allow the decoding of further information, such as an identity and information corresponding to each disturbing PLC device, facilitating identification and leakage remediation. The combination of precoder modification for beamforming schemes and power reduction for MIMO data streams may be used to achieve an optimal coexistence scheme with the mitigation of PLC leakage. Additionally, a PLC device that includes a DSL receiver port may provide additional diversity for processing PLC signals received from other PLC devices in the powerline network.

Aspects of the disclosure are initially described in the context of a wireline communications system. Further examples are provided that illustrate multi-sensor PLC devices and PLC packet transmissions on primary and alternate couplings. Aspects of the disclosure are further illustrated by and described with reference to apparatus diagrams, system diagrams, and flowcharts that relate to DSL interference measurements and PLC beamforming optimization.

FIG. 1 illustrates an example of collocated wireline communications systems 100 that support PLC interference probing and measurement on digital subscriber lines. The collocated wireline communications systems 100 may include CPEs 110 communicatively coupled to a central office (CO) 105 via a cable binder (not shown) and an adjacent PLC network with multiple PLC devices 120 in communication with each other. For example, the collocated wireline communications systems 100 may include a CO 105 that is connected to a number of remote nodes, such as CPEs 110-a through 110-k. The CPEs 110 may be communicatively coupled to the CO 105 via respective subscriber lines, denoted 115-a through 115-k. Each of the subscriber lines 115 may include, for example, one or more twisted-pair copper wire connections. A given CPE 110 may include a modem, a transceiver, a computing device, or other types of communication devices, or combinations of such devices, which are configured to send and receive data to and from CO 105.

The adjacent PLC network within the collocated wireline communications systems 100 may include multiple PLC devices 120 communicatively coupled via powerlines 125. The powerlines 125 may be, for example, lines carrying mains electricity within a building and may further be used to transmit and receive modulated data and control signals. For example, powerlines 125 may include a P line, an N line, and a PE line used by PLC devices 120 for communication. The collocated wireline communications systems 100 also may include an arbiter 130 (or AF) used to communicate with one or more CPEs 110 and one or more PLC devices 120. While the arbiter 130 is shown as a separate structure in FIG. 1, the arbiter 130 may be located within a CPE 110 or other DSL device, such as a component of one of the CPEs 110-a through 110-k. In some examples, the collocated wireline communications systems 100 supports the use of PLC packets on primary and alternate couplings for PLC signal leakage measurement in DSL subscriber lines.

Communications between the CO 105 and the CPEs 110 include both downstream and upstream communications for each of the active subscriber lines 115. The downstream direction refers to the direction from the CO 105 to a CPE 110, and the upstream direction is the direction from the CPE 110 to the CO 105. Although not explicitly shown in FIG. 1, each of the subscriber lines 115 may be coupled to a CO transmitter and a CPE receiver for use in communicating in the downstream direction, and a CPE transmitter and a CO receiver for use in communicating in the upstream direction. On both the CO 105 and CPE 110 side, hardware implementing both a transmitter and a receiver may be generically referred to as a modem or a transceiver.

In some cases, communication signals from the PLC devices 120 may interfere with DSL signal reception. For example, as mentioned above, PLC networking over the powerlines 125 uses existing electrical wiring to carry data signals through the superposition of information signals onto power waves. The powerlines 125 may be unshielded and untwisted, which may cause electromagnetic fields from the information signals to be radiated away from the powerlines 125. The electromagnetic fields may exist for both DM and CM currents that flow on the powerlines 125. These electromagnetic fields may couple into the subscriber lines 115 and flow toward the CPE 110, causing interference to a CPE 110. Another potential coupling point may be through a power supply unit (PSU) of a CPE 110. For example, the PSU may have limited CM signal rejection and a CM signal originating from a PLC network may thus produce a CM signal on the subscriber lines 115 that flows away from the CPE 110. In some examples, multiple coupling points may exist between the powerlines 125 and the subscriber lines 115.

In some cases, a PLC device 120 and a CPE 110 may both be orthogonal frequency division multiplexing (OFDM)-based transceivers that operate with a different sampling rate, baud rate, or OFDM symbol sizes. Additionally, the PLC device 120 and the CPE 110 may not be synchronized to each other (such as in frequency and phase of signals transmitted and received). As a result, interference on the CPE 110 from the PLC device 120 operating at a given frequency may be spread across adjacent frequency due to the non-orthogonality of these systems.

CM interference may be converted to DM noise due to imbalances associated with the subscriber lines 115 with respect to a common ground. For example, if a subscriber line 115 is properly balanced (perfect twist) with respect to ground and a CPE 110 has large CM signal rejection on a line side, then the CM interference may not produce any DM noise. However, if any imbalance with respect to ground exists on the subscriber lines 115 or the CPE 110 does not have perfect CM signal rejection, then at least a portion of the CM signal may be converted to DM noise (the amount of noise depending on where the CM signal coupling occurs). Thus, PLC signals that are coupled to a DSL network in CM may appear as DM noise on the DSL network.

PLC sound packet physical layer convergence procedure (PLCP) protocol data units (PPDUs) may be used for communications between multiple PLC devices 120. A PLC sound packet PPDU may include a preamble, followed by frame control symbols with guard intervals (GIs) (such as GIs of 3664 samples) and then PLC sound packet symbols. Each of the PLC sound packet symbols may be preceded by a GI (such as a GI of 1512 samples), where the GI length may be associated with a tone map used for the PLC sound packet PPDU (which may be determined by decoding audio-video frame control (AV FC)). A PLC sound packet payload may be used for both SISO and MIMO communications on power lines, and an empty tone filling mechanism may be used to generate binary information for an entire PLC sound packet payload.

In collocated wireline communications systems 100, PLC signal leakage may be detected on subscriber lines 115, where the signal leakage corresponds to PLC packets (such as PLC sound packets) transmitted on a primary coupling and an alternate coupling. For example, a device (such as a CPE 110), may determine impulse noise on the subscriber lines 115, where the impulse noise includes PLC packets transmitted by a PLC device 120. The device may then determine PLC signal leakage that corresponds to PLC packets transmitted on a primary coupling (such as a coupling between a phase power line and a neutral power line) and an alternate coupling (such as a coupling between the phase power line and a protective earth power line). Based on the determined PLC signal leakage on the primary and alternate couplings, the device may then configure a transmission power or a precoder used by the PLC device 120.

Additionally, a PLC device 120 may include a set of PLC receivers connected to powerlines 125, at least one sensor coupled to the subscriber lines 115, and a PLC transmitter configured to adjust a transmission power or a precoder. In some cases, the at least one sensor may be configured to detect PLC signal leakage on the subscriber lines 115, and the PLC transmitter may adjust the transmission power or the precoder based on the detected PLC signal leakage.

Figure 2:
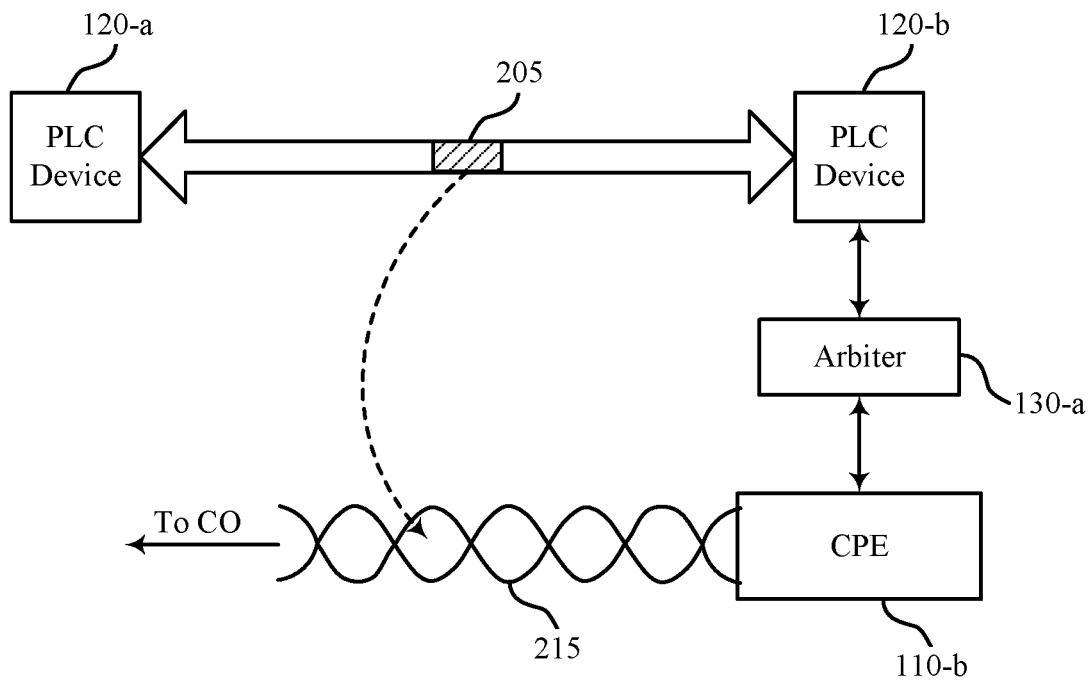
FIG. 2 illustrates an example of collocated wireline communications systems that support DSL interference measurements and PLC beamforming optimization.

FIG. 2 illustrates an example of collocated wireline communications systems 200 that support DSL interference measurements and PLC beamforming optimization. The collocated wireline communications systems 200 may include a CPE 110-*b* communicating with a CO over a set of DSL lines, such as a twisted pair 215. Additionally, the CPE 110 may be located near or within the same premises as a PLC network including PLC devices 120. The CPE 110-*b*, the twisted pair 215, and the PLC devices 120-*a* and 120-*b* may be examples of the CPE 110, the subscriber lines 115, and the PLC devices 120, respectively, described with reference to FIG. 1. The collocated wireline communications systems 200 may be an example of systems that enable the efficient measurement of PLC signal leakage into DSL subscriber lines through the detection of one or more PLC packets transmitted on primary and alternate couplings.

In some cases, an arbiter 130-*a* (also referred to as an AF) may be used to facilitate measurement of PLC signal leakage on twisted pair 215. In some implementations, the arbiter 130-*a* may be a component of the CPE 110-*b*, a component of the PLC device 120-*b*, implemented using components of both the CPE 110-*b* and the PLC device 120-*b*, or a standalone device in communication with both the CPE 110-*b* and the PLC device 120-*b*.

In the collocated wireline communications systems 200, transmissions of PLC packets on a primary coupling and an alternate coupling may be used to characterize PLC signal leakage of the different couplings onto DSL lines. The primary coupling may include a coupling between a P line and an N line, while the alternate coupling may include a coupling between a P line and a PE line. The transmission of the PLC packets 205 on the primary and alternate coupling may occur sequentially (such as using transmissions on the primary coupling followed by transmissions on the alternate coupling) or PLC packets 205 may be transmitted simultaneously.

Following a characterization of the PLC signal leakage on the twisted pair 215, PLC transmission power cutbacks and an updated precoder for use by one or more PLC devices 120 may be determined. For example, the transmission power cutbacks and precoders may be determined by the CPE 110 and communicated to the arbiter 130-*a*. Additionally or alternatively, the CPE 110-*b* may communicate measured signal leakage to the arbiter 130-a, and the arbiter 130-a may determine the transmission power cutbacks or precoders for use in the PLC network. In some examples, a PLC device 120 may determine a modified precoder for PLC transmissions to reduce PLC signal leakage. In other examples, the arbiter 130-a may determine the transmission power cutbacks and precoders based on signal leakage measurements received from CPE 110-b.

PLC transmission power cutbacks may be implemented through a configuration procedure that adjusts a transmission power spectral density (PSD). The configuration procedure may modify the PSD or update a PSD limit of a particular PLC device 120 in multiple frequency bands (such as in up to 32 frequency bands), where each frequency band may be defined by a start frequency and a stop frequency. A value of a transmission PSD modification or the PSD limit on intermediate frequencies of a band may be computed using linear interpolation over a linear frequency scale. Alternatively, for devices that do not support linear interpolation of PSD, the transmission PSD may be modified (trimmed) using a step-shaped PSD.

PLC transmission power cutbacks may be made to the primary coupling and the alternate coupling to reduce PLC signal leakage and associated interference experienced by DSL symbols transmitted on the twisted pair 215. That is, one or more measurements taken to characterize the PLC signal leakage from the primary and alternate couplings may be used to determine an amount of power cutbacks to be applied to PLC transmissions. In some cases, identical power cutbacks may be made across the primary and alternate couplings. For example, following a measurement of the PLC signal leakage of both primary and alternate coupling transmissions on the twisted pair 215, a sum of the power of the PLC signal leakage may be estimated. A reduction of the transmission power for both couplings may accordingly be made with a common modified PSD across a number of frequency bands (such as in all 32 frequency bands).

In some cases, measurements of the PLC signal leakage from transmissions of PLC packets 205 on the primary and alternate coupling may yield significantly different results. As a result, different power cutbacks may be made to the primary and alternate couplings. For instance, a first power cutback may applied to the primary coupling and a second power cutback may be applied to the alternate coupling based at on respective PLC signal leakage measurements. The power cutbacks may reduce the PLC signal leakage contributions of each of the couplings by a certain amount depending on the relative PLC signal leakage produced by primary and alternate couplings.

PLC transmission power cutbacks may take into account which type of beamforming is used for transmitting PLC signals. For example, when SISO beamforming is used, signal transmitted on the primary and alternate coupling may not be independent. Thus, PLC signal leakage may be affected by a precoder being used for the SISO beamforming. In such cases, a measurement of the PLC signal leakage on the twisted pair 215 from a PLC device 120 transmitting PLC packets using SISO beamforming may be compared to independent measurements of the PLC signal leakage from both the primary and alternate couplings. Constructive and destructive interference due to the SISO beamforming may be determined, and a modified transmission PSD may be based on the determined constructive and destructive interference.

Alternatively, when Eigen beamforming is used by a PLC device 120, the PLC signal leakage on the DSL lines is the sum of the PLC signal leakage from both the primary and alternate couplings that are measured independently. That is, a measurement of the PLC signal leakage from the primary coupling may be used to determine the extent of constructive or destructive effects of the PLC signal leakage due to the Eigen beamforming associated with the primary coupling. Another measurement of the leakage from the alternate coupling may be used to determine the extent of constructive or destructive effects of the PLC signal leakage due to the Eigen beamforming associated with the alternate coupling. Each of these measurements may then be used in conjunction to determine a modified transmission PSD in multiple frequency bands for each coupling independently. As a result, different frequencies impacted by the effect of Eigen beamforming on the primary and alternate couplings may be used during the transmission power cutback process.

In some cases, an updated or modified precoder may be determined based on PLC signal leakage determined in the twisted pair 215. That is sets of measurements taken to characterize the impact of a precoder on PLC signal leakage may be used to determine the updated precoder (such as a precoder used for a modified spot beamforming method, referred to as blind spot beamforming), which may reduce PLC signal leakage at each frequency. In such cases, the PLC signal leakage may be eliminated or reduced by using the updated precoder; however, the updated precoder may, for example, decrease channel capacity between the PLC devices 120. Thus, a tradeoff may exist between the amount of PLC signal leakage seen in the DSL lines and channel capacity between the PLC devices 120. In such cases, a determination whether to maintain a balance between the amount of PLC signal leakage seen in the twisted pair 215 and the channel capacity between PLC devices 120, or focus on improving one aspect over the other, may be made.

An indication may be provided to the PLC devices 120 whether to use precoding, or what type of precoder may be used if precoding is used by the PLC devices. For example, the PLC devices 120 may receive, such as from arbiter 130-a or from CPE 110-b, a per-frequency indication of whether to use precoding. Additionally or alternatively, the PLC devices 120 also may receive an indication that precoding is to be used and a type of precoder that may be used on a per-frequency or per-band bases. As a result, explicitly providing the PLC devices 120 with a precoder corresponding to multiple tones or bands may provide frequency selectivity.

An iterative optimization process to determine a precoder may be used to minimize PLC signal leakage into the twisted pair 215. In such cases, the iterative optimization process may be used to determine an additional phase rotation to apply to each coefficient of the precoder. For example, different offsets (such as 0, 90, 180 and 270 degrees offsets) are applied to a current precoder. Additional measurements may then be performed to characterize a power level of the PLC signal leakage at each frequency and further determine minimum power levels for the different offsets. Subsequently, a refined phase rotation may be determined for the precoder from the offsets that are determined to provide a minimum amount of power (where the refined phase rotation may be an intermediate value between the two phases determined to have the lowest signal leakage level). The optimization process may continue to refine the phase rotation to minimize the power of the PLC signal leakage measured at any given frequency. Once a phase of the precoder is determined, a relative transmission power applied to the primary and alternate couplings may be modified to cancel any remaining PLC signal leakage in the twisted pair 215. In some examples, the power adjustment process also may be iterative.

Multiple streams of PLC packets may be encoded by a transmitting PLC device 120 for MIMO transmissions on primary and alternate couplings of a set of powerlines. For instance, a first stream may be precoded by a non-identity matrix, resulting in a simultaneous transmission of a same stream on both the primary and alternate couplings with a relationship defined by a precoder. In other examples, the first stream may be encoded through a MIMO precoding process, and the first stream may correspond to transmissions on the primary coupling, where the first stream is multiplied by a precoder matrix equal to an identity matrix. Additionally, a second stream may be precoded through the MIMO precoding process, which may include a phase shift of the second stream. The second stream may correspond to transmissions on the primary and alternate couplings with the second stream also multiplied by a non-identity precoder matrix, or may correspond to transmissions on the alternate coupling when the precoder matrix is equal to an identity matrix.

MIMO blind spot Eigen beamforming may be used to minimize PLC signal leakage on DSL lines. For example, in a first optimization of an optimization process, a first column of a modified MIMO Eigen beamforming precoder may be multiplied with a PLC packet (such as a PLC sound packet) on a first stream, where a signal on a second stream is equal to zero. The first optimization may be used to determine a phase and amplitude of a precoder coefficient that lead to a minimization of the contribution of first stream transmissions to the PLC signal leakage. In a second optimization of the optimization process, a second column of the modified MIMO Eigen beamforming precoder may be multiplied with a PLC packet on the second stream, while the first stream is equal to zero. The second optimization may be used to determine a phase and amplitude of the precoder coefficient that lead to a minimization of the contribution of the second stream on the PLC signal leakage. Once the first and second optimizations are complete, a new precoder and an updated power allocation, at the frequencies for which optimization was performed, may be applied to transmissions by one or more PLC devices 120.

In the optimization processes described above, the first stream may be equal to a PLC packet and the second stream may be equal to zero, and a first column of the precoder may be determined such that the transmissions on the primary coupling and on the secondary coupling yield a minimum amount of signal leakage on the set of DSL lines. Additionally, the first stream may be equal to zero and the second stream may be equal to the PLC packet, and a second column of the precoder may be determined such that the transmissions on the primary coupling and on the secondary coupling yield a minimum amount of signal leakage on the set of DSL lines. When the precoder is unity (such as an identity matrix), the transmissions on the primary and alternate couplings may be equal to the first stream and the second stream, respectively.

In an alternative example, a column of the precoder may be equal to zero while the first and second stream are transmitted. For instance, a first stream may be a value different than zero, while the second stream is equal to zero. When a full precoder is applied to the streams, this may equate to the first stream equal to value different than zero, and the second stream also may be equal to a value different than zero, where a second column of the precoder may be set to all zeros.

CPE 110-b may perform a coherent measurement of PLC signals using characteristics associated with a PLC device 120. The coherent measurement (such as sampling incoming PLC signals with the same characteristics that a PLC receiver uses (such as sampling rate, baud rate, OFDM symbol parameters, etc.)) may enable the CPE 110-b to determine a phase and amplitude relationship of signals transmitted on the primary coupling and the alternate coupling. In some cases, a ratio of the phase and amplitude of the signals may be used to determine a modified precoder to reduce the amount of PLC signal leakage into the twisted pair 215. To perform the coherent measurement, for the purpose of determining parameters of a modified precoder, the CPE 110-b may be reconfigured to operate as a PLC device 120 or may be programmed to coherently demodulate PLC packets.

A PLC device 120 may use a CM sensor to measure signals for precoder optimization processes. The CM sensor may detect CM signals on the twisted pair 215 and may perform measurements of the PLC signal leakage. The CM signals that are detected may have a higher signal level than those on a DM port, resulting in a more reliable estimate of the channel between a primary coupling, an alternate coupling, and the twisted pair 215. A new precoder may be determined directly by a PLC device 120 from measurements made using the CM sensor.

Figure 3:
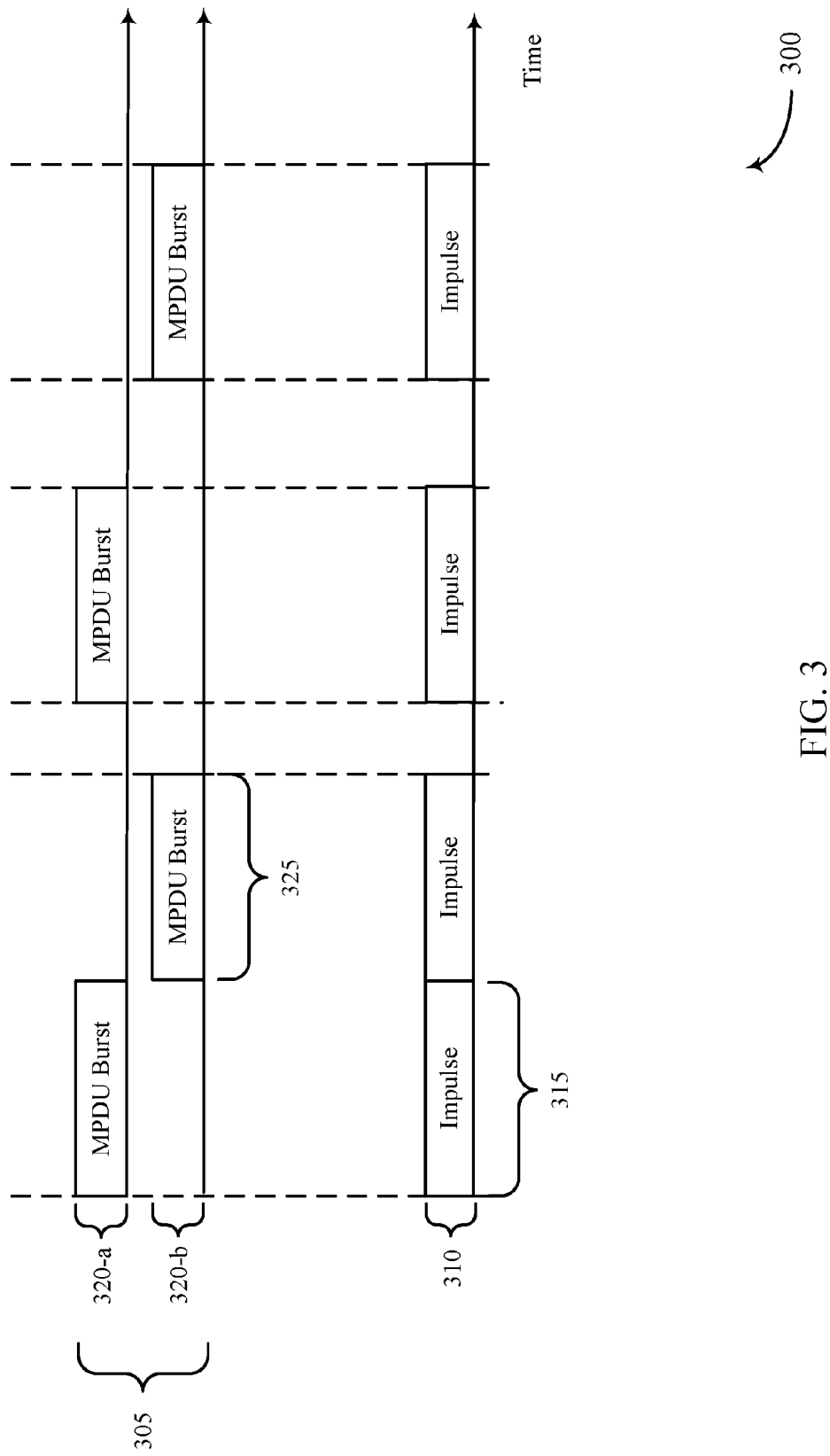
FIGS. 3 and 4 illustrate examples of sound packet transmissions in a system that supports DSL interference measurements and PLC beamforming optimization.

FIG. 3 illustrates an example of PLC packet transmissions 300 in a system that supports DSL interference measurements and PLC beamforming optimization. PLC packet transmissions 300 may include PLC signals 305 transmitted by a PLC device 120 on a primary and alternate coupling of a set of power lines and resulting in signal leakage 310 received on a set of DSL lines by a device coupled to a set of DSL lines (such as a CPE 110). The signal leakage 310 may include one or more instances of symbols impacted by interference from impulse noise 315 on the set of DSL lines. The instances of impulse noise 315 may correspond to one or more PLC packets transmitted within the PLC signals 305 by the PLC device 120, and the CPE 110 may perform measurements of PLC signal leakage based on the impulse noise 315 from the primary and alternate couplings. The PLC packet transmissions 300 may illustrate the independent measurement of the PLC signal leakage due to transmissions of PLC packets on primary and alternate couplings.

For example, the PLC signals 305 may include a first signal 320-a transmitted on a primary coupling (P-N) and a second signal 320-b transmitted on an alternate coupling (P-PE). The first signal 320-a and the second signal 320-b may both include one or more MPDU bursts 325 that further include one or more PLC packets. MPDU bursts 325 may allow a PLC device 120 to transmit multiple MPDUs in a burst without relinquishing the medium. In some cases, the MPDU burst 325 may have a specific duration, and may enable a PLC device 120 to transmit PLC packets quasi-continuously, and measurements of PLC signal leakage from the primary and alternate couplings based on these PLC packets may not be impacted by a response from a receiver.

The first signal 320-a and the second signal 320-b may be sent on the primary and alternate couplings sequentially. That is, one or more PLC packets within an MPDU burst 325 may be transmitted first on the primary coupling, and impulse noise 315 into the DSL lines corresponding to this PLC packet transmission may be measured. PLC packets within another MPDU burst 325 may be subsequently transmitted on the alternate coupling, and impulse noise 315 associated with the alternate coupling transmission may be measured. These independent measurements may enable a determination as to which coupling network, such as a primary (including the P-N wire pair) or an alternate (including the P-PE wire pair) coupling network, is more imbalanced and results in more PLC signal leakage into the DSL lines. In some cases, the frequency at which the PLC signal leakage occurs also may be determined.

In some cases, the determined PLC signal leakage from the primary and alternate couplings into the set of DSL lines may be used to mitigate the impact of PLC signal leakage on DSL lines. For example, adjustments to the PLC packet transmissions associated with each of the couplings may be made independently to mitigate the respective contributions of the first signal 320-*a* and the second signal 320-*b* to the PLC signal leakage. Additionally or alternatively, a new precoder may be determined that reduces the amount of PLC signal leakage into the set of DSL lines, and transmission power cutbacks may be determined using the independent measurements of PLC signal leakage caused by the first signal 320-*a* and the second signal 320-*b*.

Figure 4:
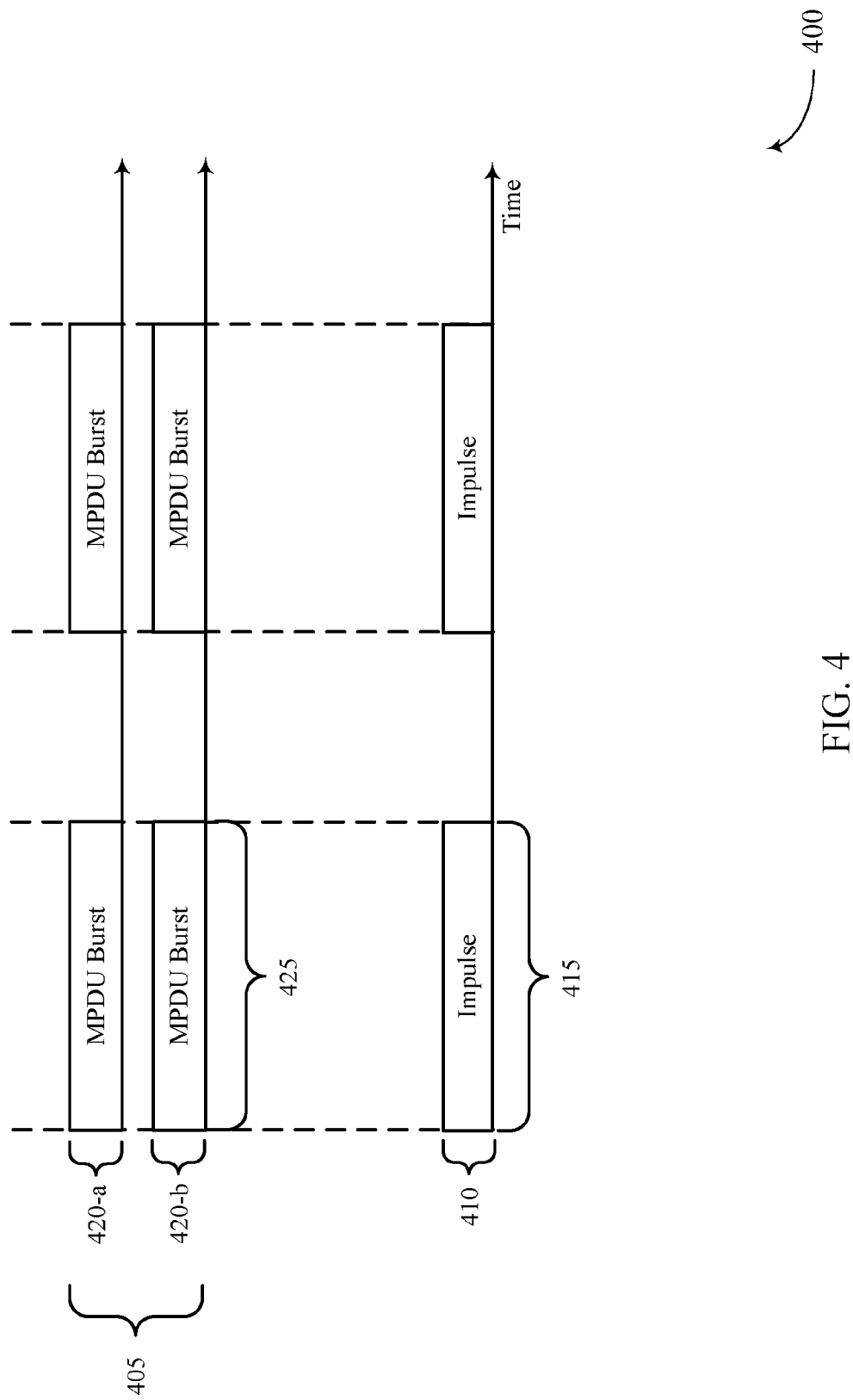

FIG. 4 illustrates an example of PLC packet transmissions 400 in a system that supports DSL interference measurements and PLC beamforming optimization. PLC packet transmissions 400 may include PLC signals 405 transmitted by a PLC device 120 on a primary and alternate coupling of a set of power lines and resulting in signal leakage 410 received on a set of DSL lines by a device coupled to a set of DSL lines (such as a CPE 110). The signal leakage 410 may include one or more instances of symbols impacted by interference from impulse noise 415 on the set of DSL lines. The instances of impulse noise 415 may correspond to one or more PLC packets (such as PLC sound packets) transmitted within the PLC signals 405 by the PLC device 120, and the CPE 110 may perform measurements of PLC signal leakage based on the impulse noise 415 from the primary and alternate couplings. The PLC packet transmissions 400 may illustrate the measurement PLC signal leakage due to the simultaneous transmission of PLC packets on primary and alternate couplings.

For example, the PLC signals 405 may include a first signal 420-*a* transmitted on a primary coupling (P-N) and a second signal 420-*b* transmitted on an alternate coupling (P-PE). The first signal 420-*a* and the second signal 420-*b* may both include one or more MPDU bursts 425 that further include one or more PLC packets. MPDU bursts 425 may allow a PLC device 120 to transmit multiple MPDUs in a burst without relinquishing the medium. In some cases, the MPDU burst 425 may have a specific duration, and may enable a PLC device 120 to transmit PLC packets quasi-continuously, and measurements of PLC signal leakage from the primary and alternate couplings based on these PLC packets may not be impacted by a response from a receiver.

The first signal 420-*a* and the second signal 420-*b* may be sent simultaneously on the primary and alternate couplings. Because constructive and destructive interference on the primary and alternate couplings may exist when transmission occurs simultaneously, the impulse noise 415 on the set of DSL lines may increase or decrease with respect to impulse noise experienced when PLC packet transmissions on primary and alternate couplings occur at different times. Accordingly, when the first signal 420-*a* and the second signal 420-*b* are transmitted simultaneously on the primary and alternate couplings, respectively, PLC signal leakage measurements may provide different information than when the sound packets are transmitted sequentially on the couplings (such as when PLC packet transmissions on the primary and alternate coupling occur sequentially, as described with reference to FIG. 3). Additionally, the first signal 420-*a* and the second signal 420-*b* may be a same or correlated signal, and constructive and destructive effects may thus take place when these signals are transmitted.

A precoding scheme used by the transmitting PLC devices 120 may be accounted for when determining PLC signal leakage corresponding to the PLC packet transmissions 400. That is, each pair of PLC devices 120 may use different precoder matrices, and multiple measurements for each pair of PLC devices 120 may be taken to characterize any signal leakage corresponding to the precoder matrices. Performing sets of measurements may enable the determination as to which of the various PLC device transmission configurations (such as SISO modulation, spot beamforming, MIMO modulation, Eigen beamforming, etc.) produces more PLC signal leakage into DSL lines and at which frequency the PLC signal leakage occurs.

The sets of measurements used to determine PLC signal leakage on the set of DSL lines may include various PLC transmission configurations for the first signal 420-*a* and the second signal 420-*b*, including various configurations of a precoder. For example, a measurement may be taken that corresponds to beamforming schemes in which the precoder is unity (such as the case where the second signal 420-*b* is a phase shifted version of the first signal 420-*a*, which may include a PLC sound packet). In another example, a measurement may be taken in which the precoder corresponds to a precoder used by a PLC device 120 or a PLC device pair for SISO communication.

Measurements also may be taken for MIMO Eigen beamforming transmission configurations, where the precoder corresponds to a precoder used in a given PLC device pair for MIMO communication. For example, when Eigen beamforming is used, the first signal 420-*a* (transmitted on the primary coupling) and the second signal 420-*b* (transmitted on the alternate coupling) may include MPDU bursts 425 with PLC packets of a first stream multiplied by the first column of the precoder, while the second stream of PLC packets is equal to zero. In a different measurement, the first signal 420-*a* (transmitted on the primary coupling) and the second signal 420-*b* (transmitted on the alternate coupling) may include MPDU bursts 425 that include a second stream of PLC packets multiplied by the second column of the precoder, while a first stream of PLC packets is equal to zero. In an additional or alternate measurement, the first signal 420-*a* and the second signal 420-*b* may include MPDU bursts 425 that include PLC packets of both streams multiplied by the full precoder.

In some cases, the determined PLC signal leakage from the primary and alternate couplings into the set of DSL lines may be used to mitigate the impact of PLC signal leakage on DSL lines. For example, adjustments to the PLC packet transmissions associated with each of the couplings may be made independently to mitigate the respective contributions of the first signal 420-*a* and the second signal 420-*b* to the PLC signal leakage. Additionally or alternatively, a new precoder may be determined that reduces the amount of PLC signal leakage into the set of DSL lines, and transmission power cutbacks may be performed as described above.

Figure 5:
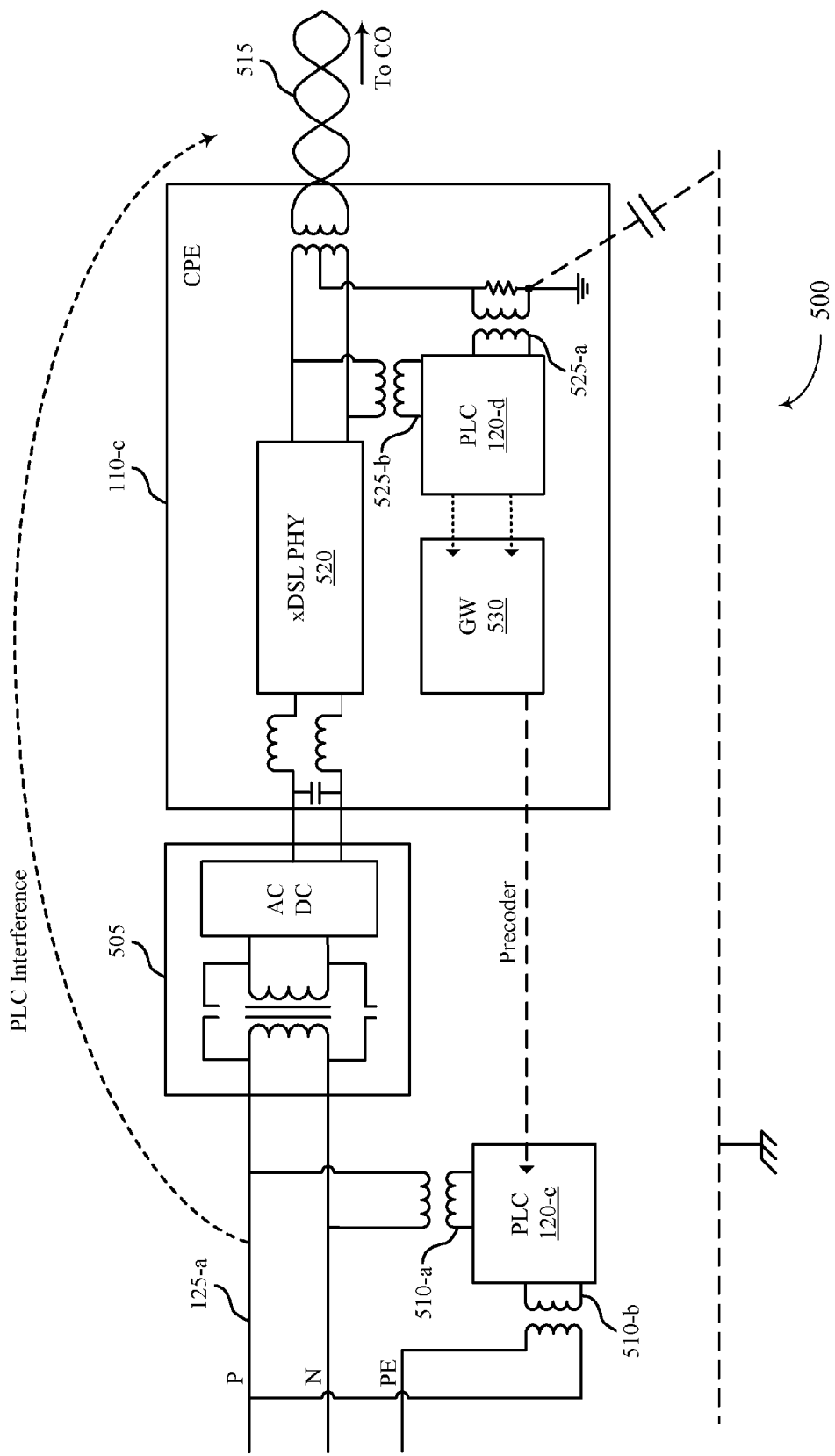
FIGS. 5 and 6 illustrate examples of multi-sensor PLC device configurations.

FIG. 5 illustrates an example of a multi-sensor PLC device configuration 500. The multi-sensor PLC device configuration 500 may include a CPE 110-*c* that is coupled with a twisted pair 515 and a separate PLC device 120-*c*. The CPE 110-*c* and the PLC device 120-*c* may be examples of the CPE 110-*a* through 110-*k* and the PLC device 120, respectively, described with reference to FIG. 1. The multi-sensor PLC device configuration 500 may be an example of a PLC device 120, having a sensor coupled with the twisted pair 515, characterizing PLC signal leakage from primary and alternate couplings in phase and amplitude. A leakage channel also may be provided to an arbiter to derive a modified precoder for at least one PLC device 120.

The CPE 110-c may be powered by a PSU 505 connected to powerlines 125-a, such as through a power outlet within a building. The PLC device 120-c also may communicate with one or more additional PLC devices 120 (not shown) over the powerlines 125-a, where the PLC device may be near or within the same premises as the CPE 110-c and the twisted pair 515. In some cases, transmissions by the PLC device 120-c may create impulse noise on the twisted pair 515.

For example, PLC device 120-c may include a number of PLC communication ports 510 that allow for transmission and reception of data on the powerlines 125-a. Additionally, the PLC communication ports 510 may enable communications over primary (P-N) and alternate (P-PE) couplings of the powerlines 125-a. For instance, a primary PLC communication port 510-a may be used by PLC device 120-c to transmit a first stream of data (such as PLC packets), and an alternate PLC communication port 510-b may be used to transmit a second stream of data. The PLC communication ports 510 may be used by the PLC device 120-c to transmit PLC packets simultaneously or sequentially over the different couplings, and various PLC transmission configurations also may be used (such as SISO modulation, Eigen beamforming, etc.). The PLC packet transmissions on the primary and alternate couplings of the powerlines 125-a may result in impulse noise and PLC interference into the twisted pair 515.

CPE 110-c may further include a DSL physical layer (PHY) component 520, an integrated PLC device 120-d, and a gateway (GW) 530. The DSL PHY component 520 may be coupled to the twisted pair 515 (including a connection to the DM and CM ports of the twisted pair 515) and may manage communications of the CPE 110-c on the twisted pair 515.

The integrated PLC device 120-d may be configured to have one or more receiver inputs connected to the twisted pair 515, and, in some examples, may not have any transmission ports. For example, the integrated PLC device 120-d may include a number of sensors 525, where a first sensor 525-a and a second sensor 525-b may be connected to the DM and CM ports of the twisted pair 515, respectively. Accordingly, coupling one or more inputs of the integrated PLC device 120-d to the twisted pair 515 may be used to determine PLC signal leakage experienced by the CPE 110-c. In some cases, measurements may be made for each transmitted PLC packet for all PLC devices 120 within a PLC network. Additionally, the integrated PLC device 120-d may be configured to demodulate PLC transmissions, and a characterization of the PLC signal leakage into the DSL lines may be made (such as phase and amplitude characteristics determined on a per-tone basis).

For example, and as described above, the PLC device 120-c may transmit one or more PLC packets (such as PLC sound packets) on the primary coupling, the alternate coupling, or both, and a corresponding PLC signal leakage into the twisted pair 515 may be determined for these couplings. Additionally, the integrated PLC device 120-d may perform a channel identification for the PLC signals transmitted on the primary and alternate couplings, such as a MIMO leakage channel identification for CM and DM signals. The integrated PLC device 120-d may demodulate a received PLC CM or DM signal on the twisted pair 515, and the demodulated PLC CM or DM signals may be used to generate a per-tone precoder that reduces PLC signal leakage into the twisted pair 515. In such cases, an orthogonality maintained between the PLC device 120-c and the integrated PLC device 120-d (such as a same sampling rate, baud rate, OFDM symbol size, etc.) may enable an adjustment of a transmission power or a precoder to reduce or eliminate PLC signal leakage into the twisted pair 515.

The GW 530 may support an AF, or may be an example of an arbiter 130, such as an arbiter 130 described with reference to FIG. 1. The AF of the GW 530 may be used to facilitate a reduction of PLC signal leakage into DSL lines. In one example, the AF may control the integrated PLC device 120 to perform a determination or measurement of PLC signal leakage and the channel identification in the twisted pair 515, and may further communicate with the PLC device 120-c. In some cases, the integrated PLC device 120-d may transmit information associated with determined PLC signal leakage and channel identification of a received signal on the twisted pair 515 to the AF of the GW 540. In some cases, the AF may characterize the PLC signal leakage associated with the primary and alternate couplings and may determine whether the signal leakage satisfies a threshold based on a transmission power level used by PLC device 120-c. The AF may then determine a transmission power backoff for the PLC device 120-c based on the information received from the integrated PLC device 120-d. In some cases, the AF may determine a transmission power cutback for each of the couplings of PLC devices on the PLC network.

In some examples, the AF of the GW 540 may determine an adjusted precoder based on the characterization of the PLC signal leakage into the twisted pair 515. In such cases, the AF may communicate the adjusted precoder to one or more PLC devices 120 on the PLC network (such as the PLC device 120-c). In some cases, sets of measurements taken to characterize the impact of a precoder on PLC signal leakage into the twisted pair 515 may be used to determine the adjusted precoder (such as a precoder used for a modified spot beamforming method, referred to as blind spot beamforming), which may reduce PLC signal leakage at each frequency. In such cases, the PLC signal leakage may be reduced or eliminated by using the adjusted precoder.

Figure 6:
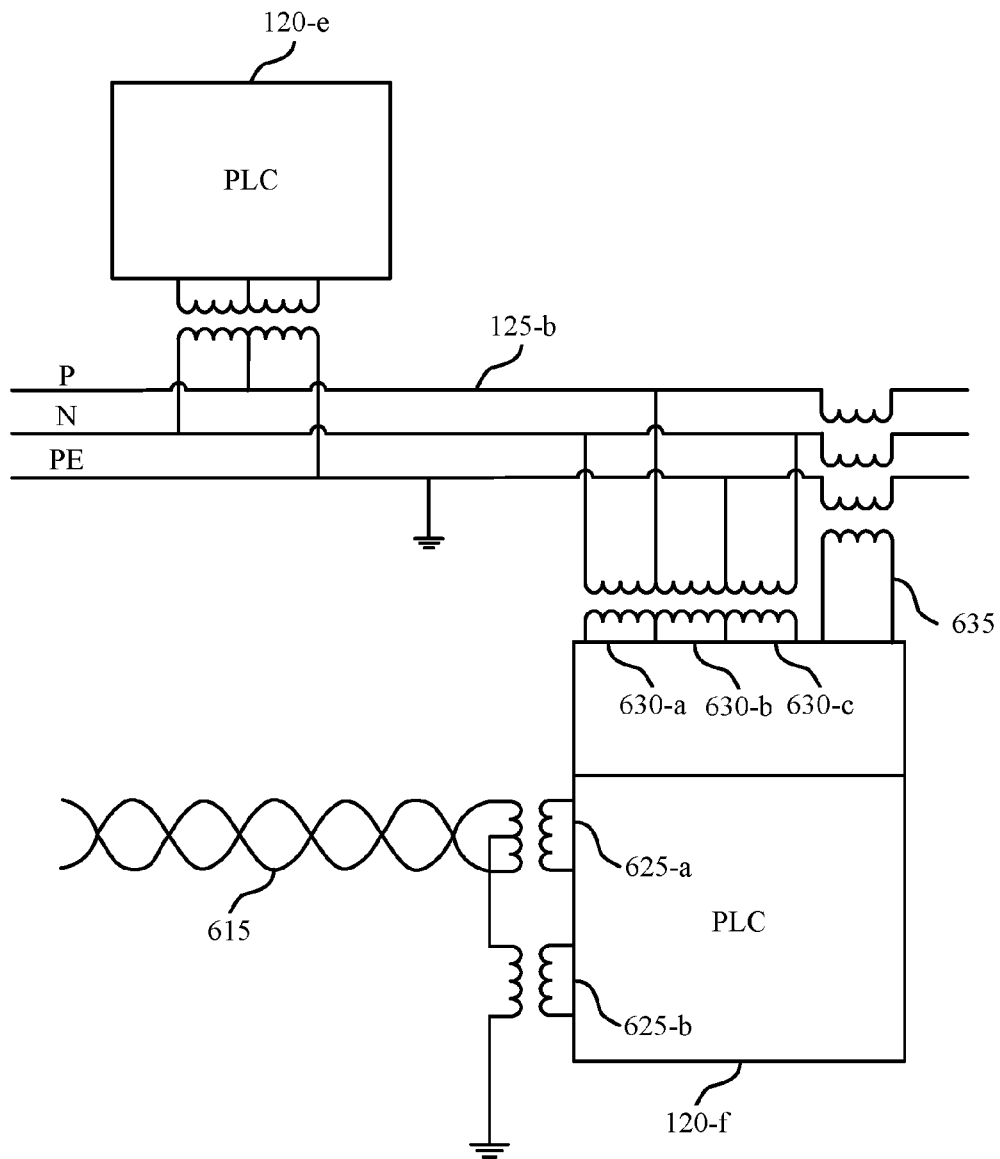

FIG. 6 illustrates an example of a multi-sensor PLC device configuration 600. The multi-sensor PLC device configuration 600 may include a first PLC device 120-e and a second PLC device 120-f, which may represent examples of the PLC devices 120 described with reference to FIG. 1. The first PLC device 120-e and the second PLC device 120-f may communicate with each other over powerlines 125-b, and the second PLC device may further connect to a twisted pair 615, which may be an example of the twisted pair 515 described with reference to FIG. 5, or the subscriber lines 115 described with reference to FIG. 1. Accordingly, the first PLC device 120-e and the second PLC device 120-f may be located within close proximity (such as within the same building) as a DSL network, and communications between the PLC devices 120 over the powerlines 125-b may cause interference on the DSL network via impulse noise. The multi-sensor PLC device configuration 600 may be an example of a PLC device 120, having a sensor coupled with the twisted pair 615, characterizing PLC signal leakage from primary and alternate couplings in phase and amplitude, where a leakage channel may be provided to an arbiter to derive a modified precoder for at least one PLC device 120.

The second PLC device 120-f may be coupled with the twisted pair 615 through one or more sensors 625. For example, the second PLC device 120-f may include a first sensor 625-*a* and a second sensor 625-*b*. The sensors 625 may be coupled to a DM termination of the twisted pair 615, a CM termination of the twisted pair 615 with respect to a local ground of the second PLC device 120-*f*, or both. In some cases, signal leakage from communications on the powerlines 125-*b* into the twisted pair 615 may be received by the second PLC device 120-*f* via the sensors 625 and demodulated. The second PLC device 120-*f* may include additional independent receiver inputs attached to the primary and alternate couplings of the powerlines 125-*b*. For example, the second PLC device 120-*f* may include a P-N receiver input 630-*a*, a P-PE receiver input 630-*b*, an N-PE receiver input 630-*d*, and a CM sensor 635.

By coupling sensors 625 of the second PLC device 120-*f* to the twisted pair 615, additional diversity with respect to processing transmitted streams on a primary coupling and an alternate coupling on the powerlines 125-*b* may be achieved. For example, the sensors 625 may serve as additional receiver inputs to the second PLC device 120-*f* and may enable detection of a transform of a CM signal that leaks through one or more coupling points between the powerlines 125-*b* and the twisted pair 615. In some cases, the added diversity corresponding to the presence of the sensors 625 may be different than diversity offered by another receiver input of the PLC device that senses the CM signal generated on the power-line network (such as CM sensor 635). Accordingly, the sensors 625 attached to the twisted pair 615 may detect a copy of the same CM signal generated on the powerlines 125-*b*, but at a different location than where CM sensor 635 detects the CM signal.

The diversity offered by the sensors 625 attached to the twisted pair 615 may be dependent on the number of points of coupling between the twisted pair 615 and the powerlines 125-*b*. For example, for a single point of coupling between the twisted pair 615 and the powerlines 125-*b*, a DM signal that is measured by the sensor 625 attached to the DM termination of the DSL twisted pair may be a linear transform of a CM signal measured on the sensor 625 attached to the CM termination of the twisted pair 615. Thus, the diversity offered by each of the sensors 625 with respect to the transmitted streams from the primary coupling and the alternate coupling may be identical. However, if there are multiple points of coupling between the powerlines 125-*b* and the twisted pair 615, then the diversity offered by each of the sensors 625 may be different.

In some cases, the sensors 625 attached to the twisted pair 615 may be used to produce MIMO receiver processing gain. That is, access to CM and DM signals on the twisted pair 615 may provide additional degrees of freedom for communication by the second PLC device. For example, a 2×4 MIMO scheme may be further extended to a 2×5 or 2×6 MIMO schemes at the second PLC device 120-*f* using the sensors 625. Adding the sensors 625 also may provide additional receiver processing by the second PLC device 120-*f* (such as analog to digital (A2D) processing, decision-feedback equalizer (DFE) processing, fast Fourier transform (FFT) processing, etc.).

Figure 7:
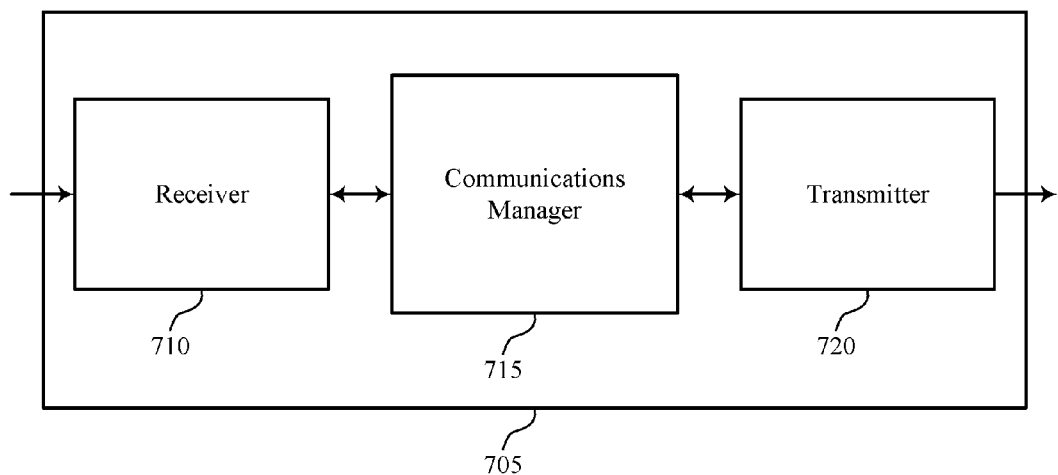
FIGS. 7 through 9 show block diagrams of a device that supports DSL interference measurements and PLC beamforming optimization.

FIG. 7 shows a block diagram 700 of a device 705 that supports DSL interference measurements and PLC beamforming optimization in accordance with various aspects of the present disclosure. The device 705 may be an example of aspects of an arbiter 130 or a CPE 110-*a* through 110-*k* as described with reference to FIG. 1. The device 705 may include a receiver 710, a communications manager 715, and a transmitter 720. The device 705 also may include a processor. Each of these components may be in communication with one another (such as via one or more buses).

The receiver 710 may receive information such as packets, user data, or control information associated with various information channels (such as control channels, data channels, and information related to DSL interference measurements and PLC beamforming optimization, etc.). Information may be passed on to other components of the device. The receiver 710 may be an example of aspects of the transceiver 1035 described with reference to FIG. 10.

The communications manager 715 may be an example of aspects of the communications manager 1015 described with reference to FIG. 10. The communications manager 715 may determine impulse noise on a set of DSL lines, where the impulse noise includes one or more PLC packets transmitted by a PLC device, determine a first PLC signal leakage corresponding to a primary coupling between a phase power line and a neutral power line and a second PLC signal leakage corresponding to an alternate coupling between the phase power line and a protective earth power line based on the one or more PLC packets, and configure, based on the first PLC signal leakage and the second PLC signal leakage, a transmission power or a precoder of the PLC device.

The transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10.

Figure 8:
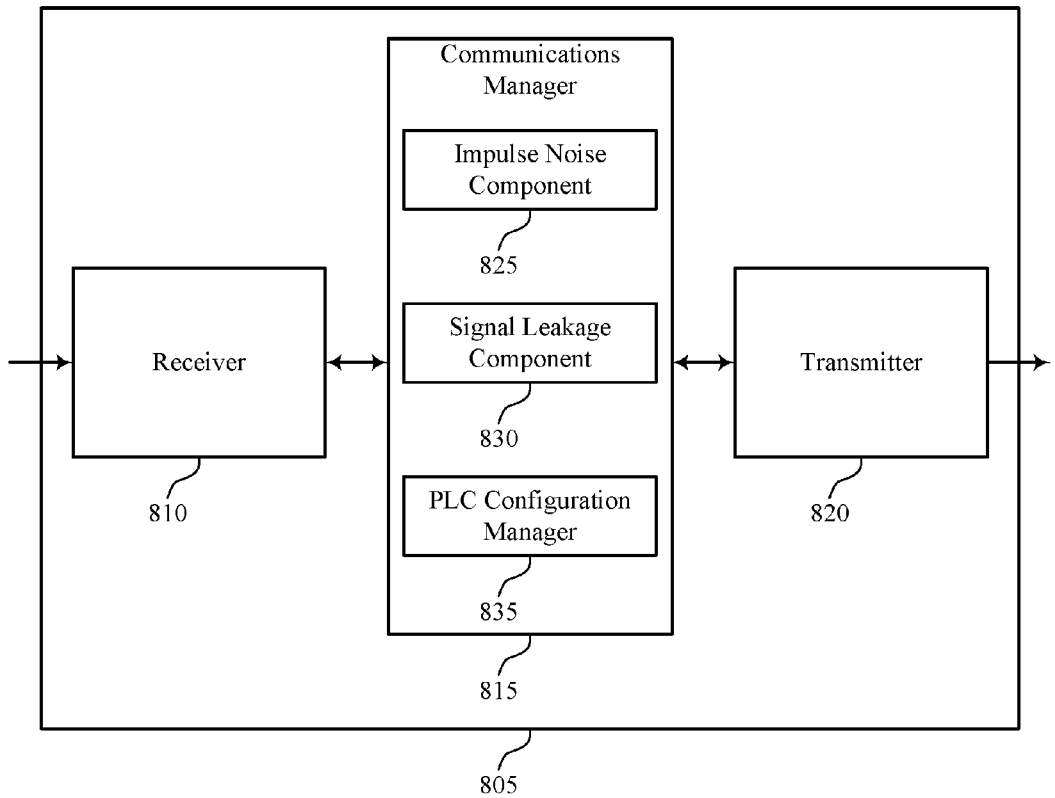

FIG. 8 shows a block diagram 800 of a device 805 that supports DSL interference measurements and PLC beamforming optimization in accordance with various aspects of the present disclosure. The device 805 may be an example of aspects of an arbiter 130 or a CPE 110-*a* through 110-*k* or a device 705, as described with reference to FIGS. 1 and 7. The device 805 may include a receiver 810, a communications manager 815, and a transmitter 820. The device 805 also may include a processor. Each of these components may be in communication with one another (such as via one or more buses).

The receiver 810 may receive information such as packets, user data, or control information associated with various information channels (such as control channels, data channels, and information related to DSL interference measurements and PLC beamforming optimization, etc.). Information may be passed on to other components of the device. The receiver 810 may be an example of aspects of the transceiver 1035 described with reference to FIG. 10.

The communications manager 815 may be an example of aspects of the communications manager 1015 described with reference to FIG. 10. The communications manager 815 also may include an impulse noise component 825, a signal leakage component 830, and a PLC configuration manager 835. The impulse noise component 825 may determine impulse noise on a set of DSL lines, where the impulse noise includes one or more PLC packets transmitted by a PLC device. In some cases, determining the impulse noise on the set of DSL lines includes: measuring the impulse noise on the set of DSL lines at a DSL device separate from the PLC device. In some cases, the DSL device is a dual sensor DSL receiver including a CM port and a DM port, and where the impulse noise is detected using the CM port. In some cases, determining the impulse noise on the set of DSL lines includes: receiving an indication of the impulse noise from a DSL device separate from the PLC device. In some cases, determining the impulse noise on the set of DSL lines includes: measuring the impulse noise over at least one twisted pair coupled with a PLC device.

The signal leakage component 830 may determine a first PLC signal leakage corresponding to a primary coupling between a phase power line and a neutral power line and a second PLC signal leakage corresponding to an alternate coupling between the phase power line and a protective earth power line based on the one or more PLC packets. In some cases, the signal leakage component 830 may identify the one or more PLC packets as corresponding to the primary coupling, the alternate coupling, or both, determine whether precoding is used by the PLC device on the primary coupling and the alternate coupling to transmit the PLC packets, and determine, at a frequency, a minimum power associated with the first PLC leakage and the second PLC signal leakage. Additionally or alternatively, determining the first PLC signal leakage and the second PLC signal leakage includes decoding one or more PLC packets.

In some examples, the signal leakage component 830 may detect a CM signal using a CM sensor and at least one sensor coupled to the set of DSL lines. The signal leakage component 830 also may detect a DM signal using a DM sensor and at least one sensor coupled to the set of DSL lines. Additionally or alternatively, the signal leakage component 830 may detect a CM signal and a DM signal using both the CM sensor and DM sensor. In some cases, determining the first PLC signal leakage and the second PLC signal leakage includes sampling one or more PLC packets. In some cases, determining PLC leakage corresponding to the primary coupling and the alternate coupling includes identifying respective transfer functions for the primary coupling and the secondary coupling. In some cases, the one or more PLC packets may include PLC sound packets.

The PLC configuration manager 835 may configure, based on the first PLC signal leakage and the second PLC signal leakage, a transmission power or a precoder of the PLC device, determine one or more parameters for modifying a precoder based on the decoding, and select the precoder used for SISO communication or the precoder used for MIMO communication based on the determined minimum power. In some cases, the precoder is from a group including a precoder used for SISO communication between a first PLC device and a second PLC device and a precoder used for MIMO communication between the first PLC device and the second PLC device.

In some examples, the PLC configuration manager 835 may configure the precoder to minimize PLC signal leakage from at least one PLC device or maximize PLC signal leakage from the at least one PLC device, wherein the at least one PLC device comprises a PLC device coupled to a set of power lines, a PLC device coupled to the set of DSL lines, or both. In some cases, configuring the transmission power of the PLC device includes setting an equal power backoff of the primary coupling and the alternate coupling or setting a first power backoff of the primary coupling and a second power backoff of the alternate coupling. Additionally or alternatively, configuring the transmission power of the PLC device includes setting a frequency-specific power backoff of the primary coupling and the alternate coupling.

The transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10.

Figure 9:
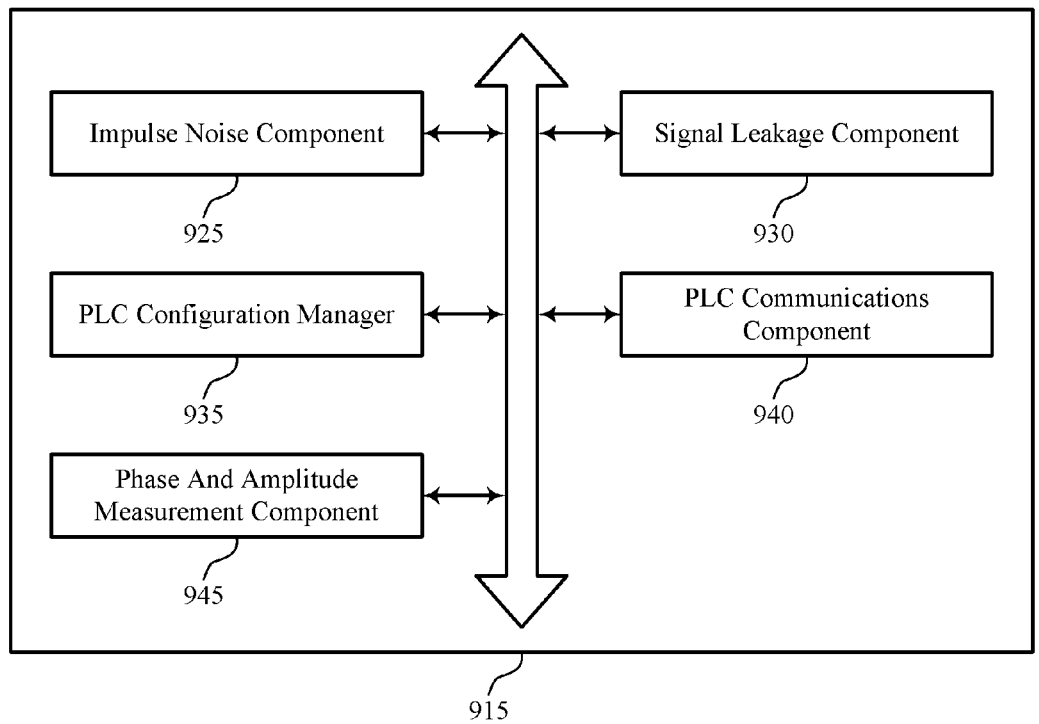

FIG. 9 shows a block diagram 900 of a communications manager 915 that supports DSL interference measurements and PLC beamforming optimization in accordance with various aspects of the present disclosure. The communications manager 915 may be an example of aspects of a communications manager 715, a communications manager 815, or a communications manager 1015 described with reference to FIGS. 7, 8 and 10. The communications manager 915 may include an impulse noise component 925, a signal leakage component 930, a PLC configuration manager 935, a PLC communications component 940, and a phase and amplitude measurement component 945. Each of these modules may communicate, directly or indirectly, with one another (such as via one or more buses).

The impulse noise component 925 may determine impulse noise on a set of DSL lines, where the impulse noise includes one or more PLC packets transmitted by a PLC device. In some cases, determining the impulse noise on the set of DSL lines includes: measuring the impulse noise on the set of DSL lines at a DSL device separate from the PLC device. In some cases, the DSL device is a dual sensor DSL receiver including a CM port and a DM port, and where the impulse noise is detected using the CM port. In some cases, determining the impulse noise on the set of DSL lines includes: receiving an indication of the impulse noise from a DSL device separate from the PLC device. In some cases, determining the impulse noise on the set of DSL lines includes: measuring the impulse noise over at least one twisted pair coupled with a PLC device.

The signal leakage component 930 may determine a first PLC signal leakage corresponding to a primary coupling between a phase power line and a neutral power line and a second PLC signal leakage corresponding to an alternate coupling between the phase power line and a protective earth power line based on the one or more PLC packets. The signal leakage component 930 also may identify the one or more PLC packets as corresponding to the primary coupling, the alternate coupling, or both, and determine whether precoding is used by the PLC device on the primary coupling and the alternate coupling to transmit the PLC packets. In some examples, the signal leakage component 930 may determine, at a frequency, a minimum power associated with the first PLC leakage and the second PLC signal leakage. In some cases, determining the first PLC signal leakage and the second PLC signal leakage includes: sampling one or more PLC packets. In some cases, determining the first PLC signal leakage and the second PLC signal leakage includes: decoding one or more PLC packets. In some cases, determining PLC leakage corresponding to the primary coupling and the alternate coupling includes: identifying respective transfer functions for the primary coupling and the secondary coupling. In some cases, the one or more PLC packets include PLC sound packets.

The PLC configuration manager 935 may configure, based on the first PLC signal leakage and the second PLC signal leakage, a transmission power or a precoder of the PLC device, determine one or more parameters for modifying a precoder based on the decoding, and select the precoder used for SISO communication or the precoder used for MIMO communication based on the determined minimum power. In some cases, the precoder is from a group consisting of: a precoder used for SISO communication between a first PLC device and a second PLC device and a precoder used for MIMO communication between the first PLC device and the second PLC device. In some cases, configuring the transmission power of the PLC device includes: setting an equal power backoff of the primary coupling and the alternate coupling or setting a first power backoff of the primary coupling and a second power backoff of the alternate coupling. In some cases, configuring the transmission power of the PLC device includes: setting a frequency-specific power backoff of the primary coupling and the alternate coupling.

The PLC communications component 940 may transmit an indication to the PLC device of whether to use the primary coupling, the alternate coupling, or both for transmitting the PLC packets, transmit an indication to the PLC device of whether to use precoding to transmit the PLC packets, and transmit the determined one or more parameters to the PLC device. In some cases, the PLC communications component 940 may transmit, to an arbiter, the first signal leakage, the second signal leakage, or both. The phase and amplitude measurement component 945 may measure a phase and amplitude relationship for the primary coupling and the secondary coupling based on the sampled one or more PLC packets.

Figure 10:
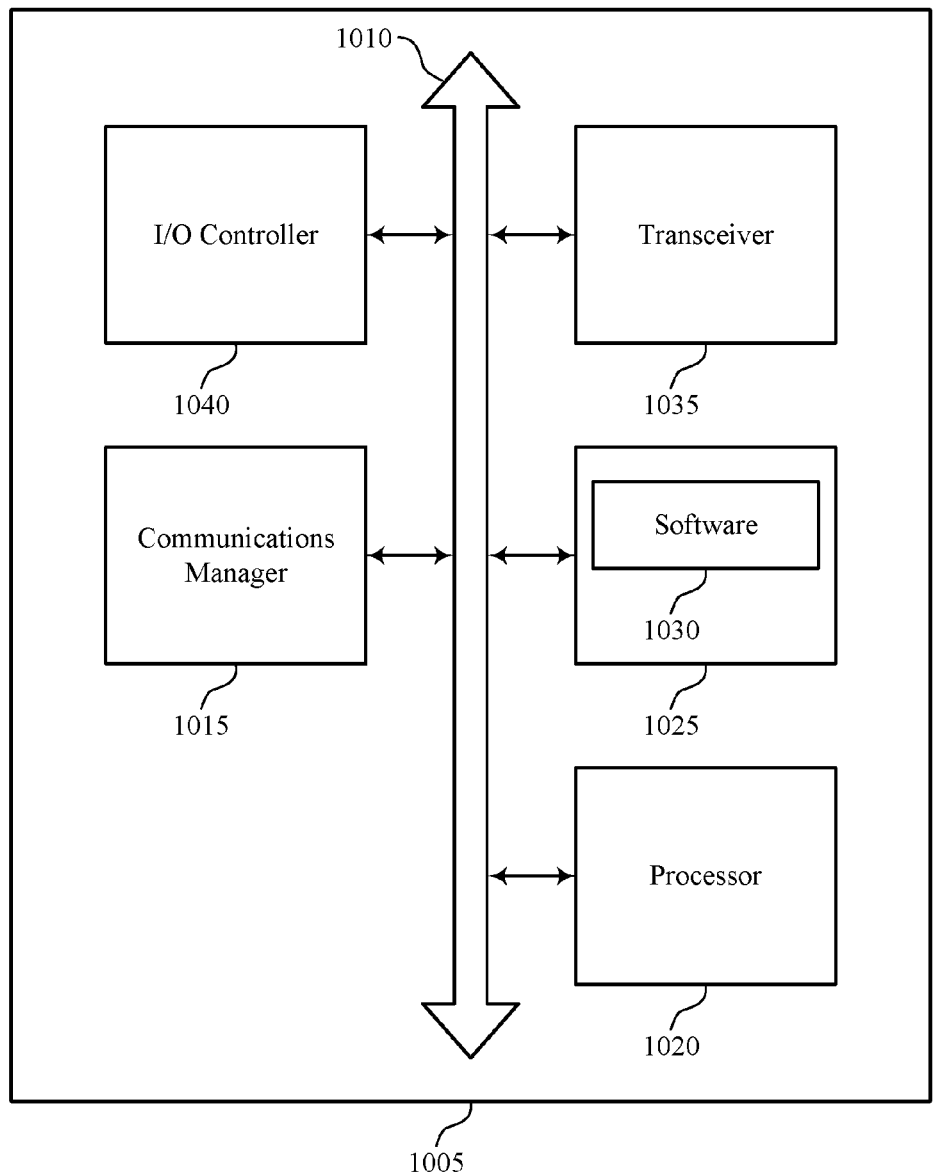
FIG. 10 illustrates a block diagram of a system including a device that supports DSL interference measurements and PLC beamforming optimization.

FIG. 10 shows a diagram of a system 1000 including a device 1005 that supports DSL interference measurements and PLC beamforming optimization in accordance with various aspects of the present disclosure. Device 1005 may be an example of or include the components of device 705, device 805, or an arbiter 130 or a CPE 110-a through 110-k as described above with reference to FIGS. 1, 7 and 8. Device 1005 may include components for bi-directional voice and data communications including components for transmitting and receiving communications, including a communications manager 1015, a processor 1020, a memory 1025, software 1030, a transceiver 1035, and an input/output (I/O) controller 1040. These components may be in electronic communication via one or more busses (such as bus 1010).

The processor 1020 may include an intelligent hardware device, (such as a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into the processor 1020. The processor 1020 may be configured to execute computer-readable instructions stored in a memory to perform various functions (such as functions or tasks supporting DSL interference measurements and PLC beamforming optimization).

The memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and software operation such as the interaction with peripheral components or devices.

The software 1030 may include code to implement aspects of the present disclosure, including code to support DSL interference measurements and PLC beamforming optimization. The software 1030 may be stored in a non-transitory computer-readable medium such as system memory or other memory. In some cases, the software 1030 may not be directly executable by the processor but may cause a computer (such as when compiled and executed) to perform functions described herein.

The transceiver 1035 may communicate bi-directionally, via one or more wired links as described above. For example, the transceiver 1035 may represent a wireline transceiver and may communicate bi-directionally with another wireline transceiver. The transceiver 1035 also may include a modem to modulate the packets and provide modulated packets for transmission, and demodulate received packets.

The I/O controller 1040 may manage input and output signals for the device 1005. The I/O controller 1040 also may manage peripherals not integrated into the device 1005. In some cases, the I/O controller 1040 may represent a physical connection or port to an external peripheral. In some cases, the I/O controller 1040 may utilize an operating system such as iOS®, ANDROID®, MS-DOS®, MS-WINDOWS®, OS/2®, UNIX®, LINUX®, or another known operating system.

Figure 11:
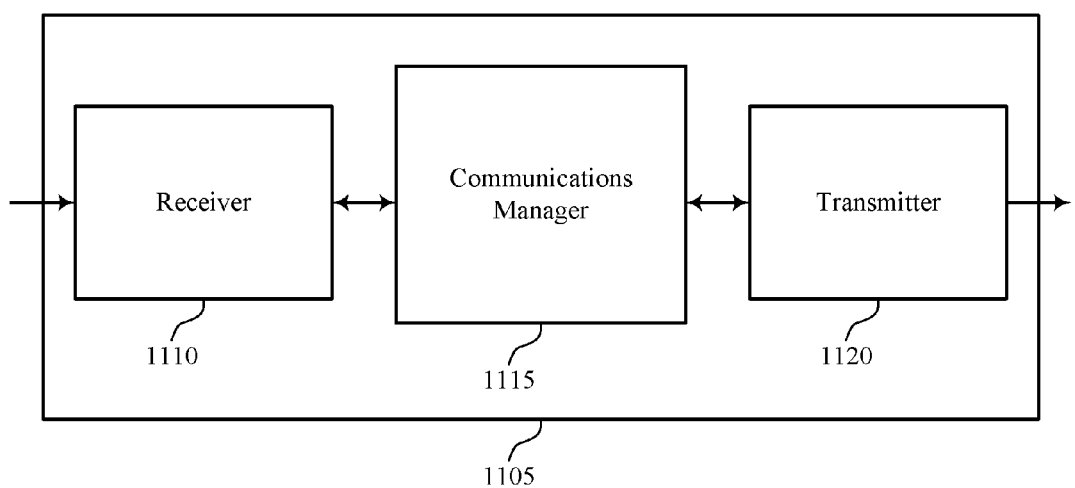
FIGS. 11 and 12 show block diagrams of a multi-sensor PLC device.

FIG. 11 shows a block diagram 1100 of a device 1105 that may be an example of a multi-sensor PLC device in accordance with various aspects of the present disclosure. The device 1105 also may be an example of aspects of a PLC device 120, an arbiter 130, or a CPE 110-a through 110-k, or a component thereof as described with reference to FIGS. 1 through 6. The device 1105 may include a receiver 1110, a communications manager 1115, and a transmitter 1120. The device 1105 also may include a processor. Each of these components may be in communication with one another (such as via one or more buses).

The receiver 1110 may receive information such as packets, data, or control information associated with various information channels (such as control channels, data channels, information for a multi-sensor PLC device, etc.). For example, receiver 1110 may be an example of a PLC receiver, and may be coupled to a set of power lines. Information may be passed on to other components of the device, where the receiver 1110 may receive signals on the set of power lines and send the signals to the communications manager 1115. The receiver 1110 may be an example of aspects of a transceiver or a modem.

The communications manager 1115 may facilitate the detection of PLC signal leakage on a DSL lines. In some cases, the communications manager 1115 may communicate with an arbiter, such as an arbiter 130 as described with reference to FIG. 1. The transmitter 1120 may transmit signals generated by other components of the device. In some examples, the transmitter 1120 may be collocated with a receiver 1110 in a transceiver module. In some examples, the transmitter 1120 may be an example of a PLC transmitter, and may be configured to adjust a transmission power or a precoder based on the detected signal leakage.

Figure 12:
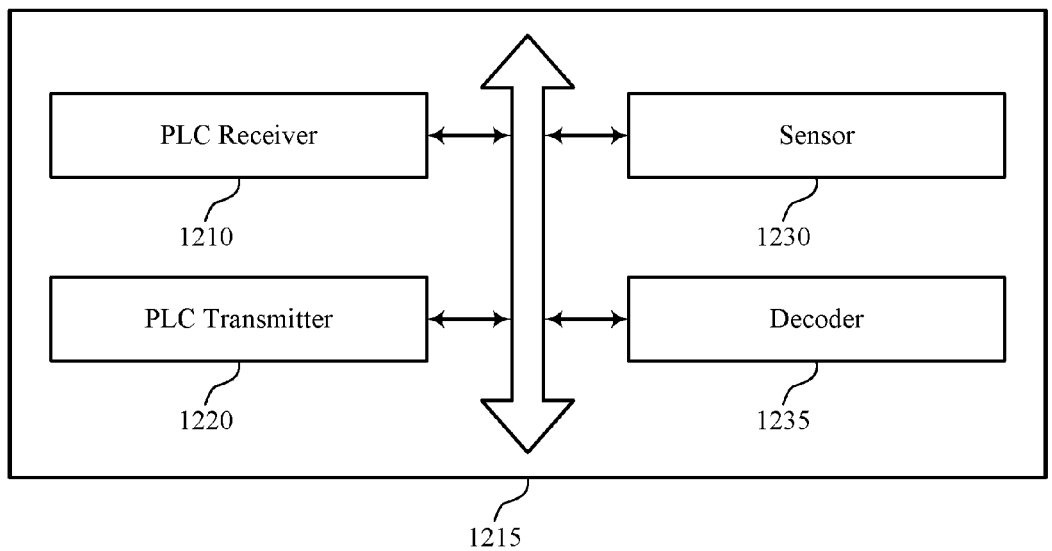

FIG. 12 shows a block diagram 1200 of a device 1215 that may be an example of a multi-sensor PLC device in accordance with various aspects of the present disclosure. The device 1215 may be an example of aspects of a communications manager 1115 described with reference to FIG. 11. The device 1215 may include a PLC receiver 1210, a PLC transmitter 1220, a sensor 1230, and a decoder 1235. Each of these components may communicate, directly or indirectly, with one another (such as via one or more buses).

The PLC receiver 1210 may be coupled to a set of power lines, and the PLC receiver 1210 may further include a CM sensor configured to coherently detect a CM signal with the at least one sensor, a DM sensor configured to coherently detect a DM signal with the at least on sensor, or both. In some cases, the PLC receiver 1210 may be further configured to transmit the detected PLC signal leakage to an arbiter, such as an arbiter 130 described with reference to FIG. 1. The PLC transmitter 1220 may be configured to adjust a transmission power or a precoder based on the detected PLC signal leakage. In some cases, the precoder is used for MIMO communications on the set of power lines. In some cases, the precoder is configured to minimize PLC signal leakage from at least one PLC device. Additionally or alternatively, the precoder may be configured to maximize PLC signal leakage from at least on PLC device. For example, a PLC device connected to a twisted pair (either a CM or CM/DM connection) may use an additional sensor to augment the capacity of a system. As a result, the precoder may be configured to achieve a maximum capacity for PLC transmissions, which may correspond to a maximum PLC signal leakage into the twisted pair.

The sensor 1230 may be coupled to a DSL line, and may be configured to detect PLC signal leakage on the DSL line. In some cases, the sensor 1225 may include a CM port or a DM port, and PLC signal leakage may be detected on one or both of the CM port or the DM port attached to the twisted pair. In some cases, the PLC signal leakage includes a first PLC signal leakage and a second PLC signal leakage, where the first PLC signal leakage corresponds to a primary coupling between a phase power line and a neutral power line, and the second PLC signal leakage corresponds to an alternate coupling between the phase power line and a protective earth power line. In some cases, the PLC signal leakage is detected based on one or more PLC sound packets transmitted on the set of power lines. The decoder 1235 may decode one or more PLC sound packets transmitted on the set of power lines.

Figure 13:
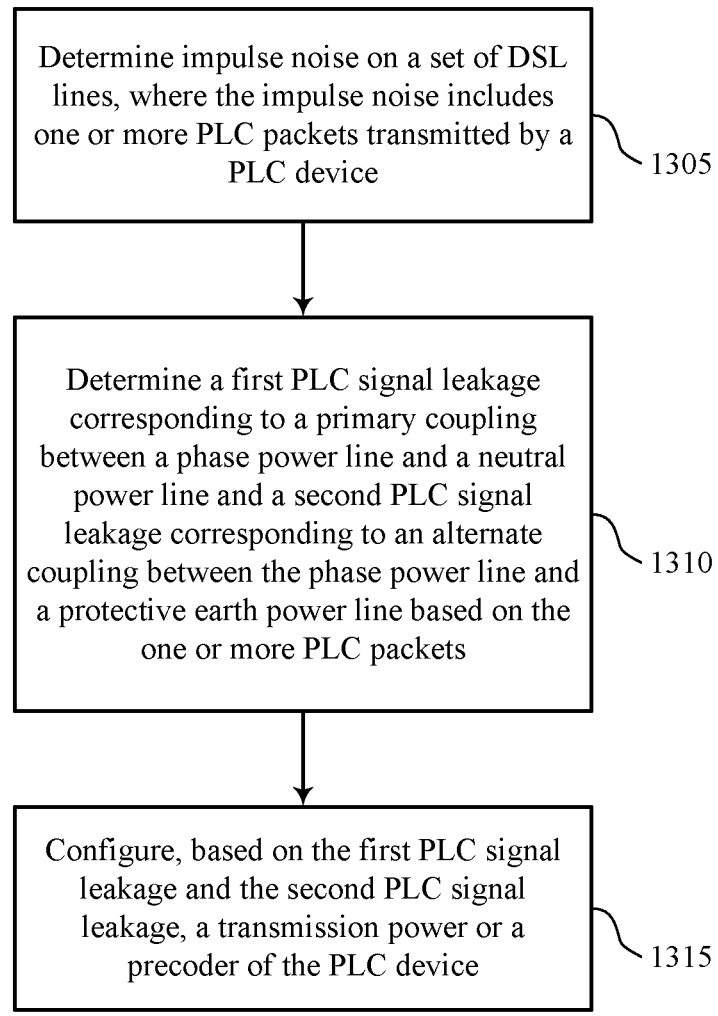
FIGS. 13 through 15 illustrate methods for DSL interference measurements and PLC beamforming optimization.

FIG. 13 shows a flowchart illustrating a method 1300 for DSL interference measurements and PLC beamforming optimization in accordance with various aspects of the present disclosure. The operations of the method 1300 may be implemented by a device, such as a CPE 110 or a DSL receiver, or its components as described herein. For example, the operations of the method 1300 may be performed by a communications manager as described with reference to FIGS. 7 through 10. For clarity of explanation, the method 1300 will be discussed using the example of a CPE 110 performing the operations, but the method 1300 also may be performed by a PLC device 120. In some examples, the CPE 110 may execute a set of codes to control the functional elements of the CPE 110 to perform the functions described below. Additionally or alternatively, the CPE 110 may perform aspects of the functions described below using special-purpose hardware.

At block 1305 the CPE 110 may determine impulse noise on a set of DSL lines, where the impulse noise includes one or more PLC packets transmitted by a PLC device. The operations of block 1305 may be performed according to the methods described with reference to FIGS. 1 through 6. In certain examples, aspects of the operations of block 1305 may be performed by an impulse noise component 825 or an impulse noise component 925 as described with reference to FIGS. 8 through 10.

At block 1310 the CPE 110 may determine a first PLC signal leakage corresponding to a primary coupling between a phase power line and a neutral power line and a second PLC signal leakage corresponding to an alternate coupling between the phase power line and a protective earth power line based on the one or more PLC packets. The operations of block 1310 may be performed according to the methods described with reference to FIGS. 1 through 6. In certain examples, aspects of the operations of block 1310 may be performed by a signal leakage component 830 or a signal leakage component 930 as described with reference to FIGS. 8 through 10.

At block 1315 the CPE 110 may configure, based on the first PLC signal leakage and the second PLC signal leakage, a transmission power or a precoder of the PLC device. The operations of block 1315 may be performed according to the methods described with reference to FIGS. 1 through 6. In certain examples, aspects of the operations of block 1315 may be performed by a PLC configuration manager 835 or a PLC configuration manager 935 as described with reference to FIGS. 8 through 10.

Figure 14:
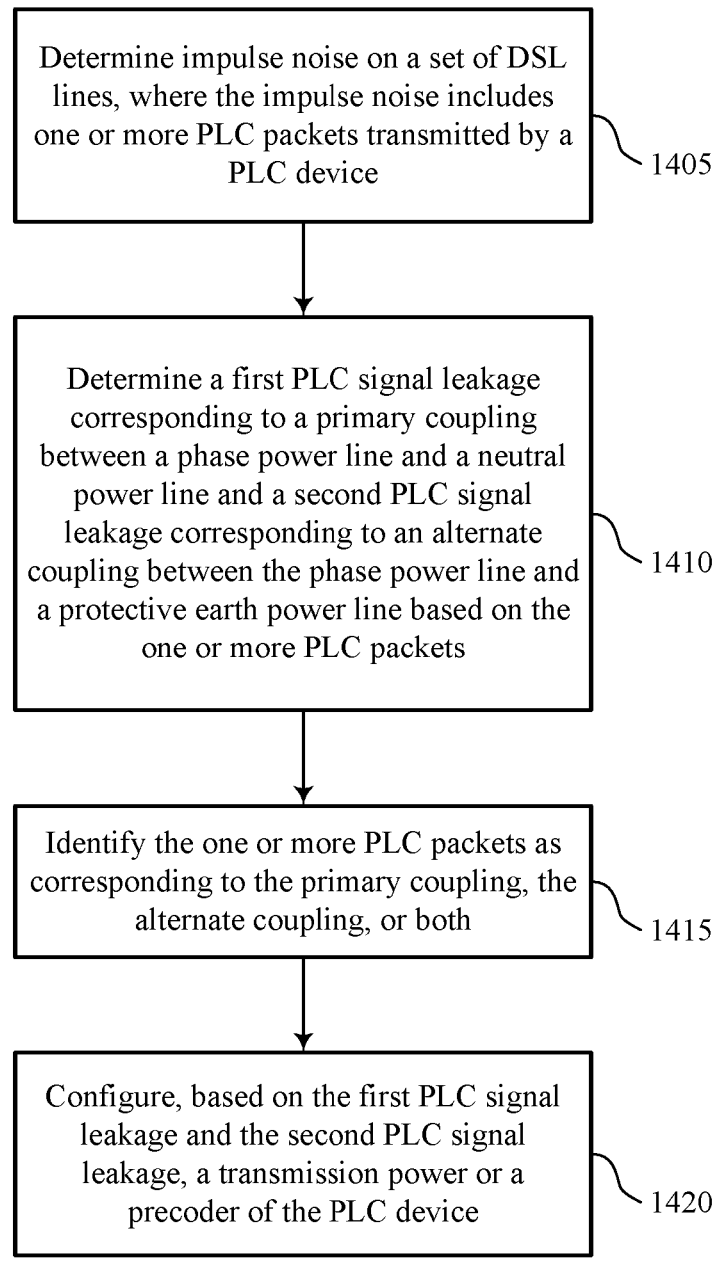

FIG. 14 shows a flowchart illustrating a method 1400 for DSL interference measurements and PLC beamforming optimization in accordance with various aspects of the present disclosure. The operations of method 1400 may be implemented by a device, such as a CPE 110 or a DSL receiver, or its components as described herein. For example, the operations of method 1400 may be performed by a communications manager 715, a communications manager 815, a communications manager 915 or a communications manager 1015 as described with reference to FIGS. 7 through 10, respectively. For clarity of explanation, the method 1400 will be discussed using the example of a CPE 110 performing the operations, but the method 1400 also may be performed by a PLC device 120. In some examples, the CPE 110 may execute a set of codes to control the functional elements of the device to perform the functions described below. Additionally or alternatively, the CPE 110 may perform aspects the functions described below using special-purpose hardware.

At block 1405 the CPE 110 may determine impulse noise on a set of DSL lines, where the impulse noise includes one or more PLC packets transmitted by a PLC device. The operations of block 1405 may be performed according to the methods described with reference to FIGS. 1 through 6. In certain examples, aspects of the operations of block 1405 may be performed by an impulse noise component as described with reference to FIGS. 8 through 10.

At block 1410 the CPE 110 may determine a first PLC signal leakage corresponding to a primary coupling between a phase power line and a neutral power line and a second PLC signal leakage corresponding to an alternate coupling between the phase power line and a protective earth power line based on the one or more PLC packets. The operations of block 1410 may be performed according to the methods described with reference to FIGS. 1 through 6. In certain examples, aspects of the operations of block 1410 may be performed by a signal leakage component 830 or a signal leakage component 930 as described with reference to FIGS. 8 through 10.

At block 1415 the CPE 110 may identify the one or more PLC packets as corresponding to the primary coupling, the alternate coupling, or both. The operations of block 1415 may be performed according to the methods described with reference to FIGS. 1 through 6. In certain examples, aspects of the operations of block 1415 may be performed by a signal leakage component 830 or a signal leakage component 930 as described with reference to FIGS. 8 through 10.

At block 1420 the CPE 110 may configure, based on the first PLC signal leakage and the second PLC signal leakage, a transmission power or a precoder of the PLC device. The operations of block 1420 may be performed according to the methods described with reference to FIGS. 1 through 6. In certain examples, aspects of the operations of block 1420 may be performed by a PLC configuration manager 835 or a PLC configuration manager 935 as described with reference to FIGS. 8 through 10.

Figure 15:
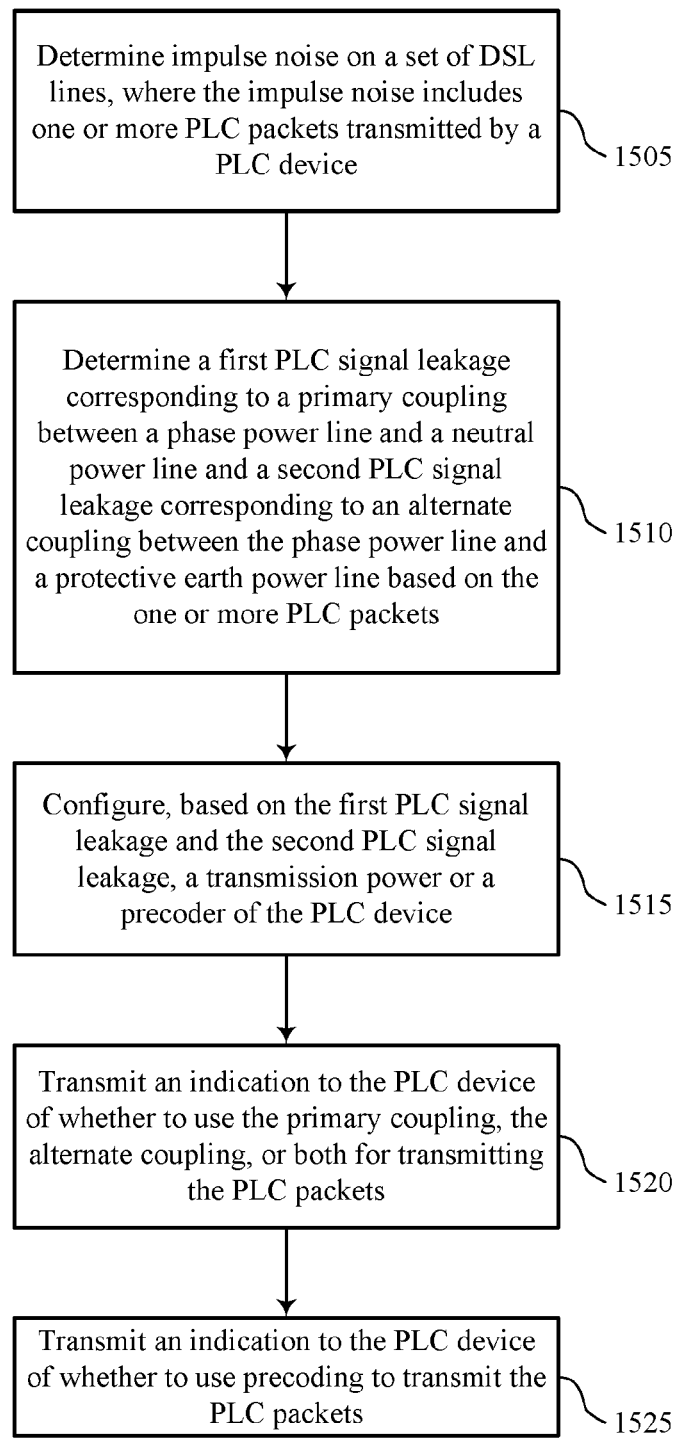

FIG. 15 shows a flowchart illustrating a method 1500 for DSL interference measurements and PLC beamforming optimization in accordance with various aspects of the present disclosure. The operations of method 1500 may be implemented by a device, such as a CPE 110 or DSL receiver, or its components as described herein. For example, the operations of method 1500 may be performed by a communications manager 715, a communications manager 815, a communications manager 915 or a communications manager 1015 as described with reference to FIGS. 7 through 10. For clarity of explanation, the method 1500 will be discussed using the example of a CPE 110 performing the operations, but the method 1500 also may be performed by a PLC device 120. In some examples, the CPE 110 may execute a set of codes to control the functional elements of the device to perform the functions described below. Additionally or alternatively, the CPE 110 may perform aspects the functions described below using special-purpose hardware.

At block 1505 the CPE 110 may determine impulse noise on a set of DSL lines, where the impulse noise includes one or more PLC packets transmitted by a PLC device. In some examples, the one or more PLC packets may include a PLC sound packet. The operations of block 1505 may be performed according to the methods described with reference to FIGS. 1 through 6. In certain examples, aspects of the operations of block 1505 may be performed by an impulse noise component 825 or an impulse noise component 925 as described with reference to FIGS. 8 through 10.

At block 1510 the CPE 110 may determine a first PLC signal leakage corresponding to a primary coupling between a phase power line and a neutral power line and a second PLC signal leakage corresponding to an alternate coupling between the phase power line and a protective earth power line based on the one or more PLC packets. The operations of block 1510 may be performed according to the methods described with reference to FIGS. 1 through 6. In certain examples, aspects of the operations of block 1510 may be performed by a signal leakage component 830 or a signal leakage component 930 as described with reference to FIGS. 8 through 10.

At block 1515 the CPE 110 may configure, based on the first PLC signal leakage and the second PLC signal leakage, a transmission power or a precoder of the PLC device. The operations of block 1515 may be performed according to the methods described with reference to FIGS. 1 through 6. In certain examples, aspects of the operations of block 1515 may be performed by a PLC configuration manager as described with reference to FIGS. 8 through 10.

At block 1520 the CPE 110 may transmit an indication to the PLC device of whether to use the primary coupling, the alternate coupling, or both for transmitting the PLC packets. The operations of block 1520 may be performed according to the methods described with reference to FIGS. 1 through 6. In certain examples, aspects of the operations of block 1520 may be performed by a PLC communications component 940 as described with reference to FIG. 9.

At block 1525 the CPE 110 may transmit an indication to the PLC device of whether to use precoding to transmit the PLC packets. Alternatively, the CPE 110 may provide a precoder to the PLC device. The operations of block 1525 may be performed according to the methods described with reference to FIGS. 1 through 6. In certain examples, aspects of the operations of block 1525 may be performed by a PLC communications component 940 as described with reference to FIG. 9.

It should be noted that the methods described above describe possible implementations, and that the operations and the steps may be rearranged or otherwise modified and that other implementations are possible. Furthermore, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and features disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c. Also, as used herein, the phrase "based on" shall not be construed as a reference to a closed set of conditions. For example, an implementation, process or procedure that is described as "based on condition A" may be based on both a condition and a condition B without departing from the scope of the present disclosure. In other words, as used herein, the phrase "based on" shall be construed in the same manner as the phrase "based at least in part on."

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general purpose processor may be a microprocessor, or, any conventional processor, controller, microcontroller or state machine. A processor also may be implemented as a combination of computing devices, such as a combination of a DSP and a microprocessor, a plurality of microprocessors, one or more microprocessors in conjunction with a DSP core or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A powerline communication (PLC) device for wireline communications, comprising:
   a set of PLC receivers coupled to a set of power lines;
   at least one sensor coupled to a digital subscriber line (DSL) line, the at least one sensor configured to detect PLC signal leakage on the DSL line, wherein the PLC signal leakage comprises a first PLC signal leakage and a second PLC signal leakage, wherein the first PLC signal leakage corresponds to a primary coupling between a phase power line and a neutral power line, and the second PLC signal leakage corresponds to an alternate coupling between the phase power line and a protective earth power line; and
   a PLC transmitter configured to adjust a transmission power or a precoder based at least in part on the detected PLC signal leakage.

2. The PLC device of claim 1, wherein the at least one sensor comprises a common mode (CM) port or a differential mode (DM) port, and wherein the PLC signal leakage is detected on one or both of the CM port or the DM port.

3. The PLC device of claim 1, wherein a PLC receiver of the set of PLC receivers comprises:
   a CM sensor configured to coherently detect a CM signal with the at least one sensor, a DM sensor configured to coherently detect a DM signal with the at least on sensor, or both.

4. The PLC device of claim 1, wherein a PLC receiver of the set of PLC receivers is further configured to transmit the detected PLC signal leakage to an arbiter.

5. The PLC device of claim 1, further comprising:
   a decoder to decode one or more PLC sound packets transmitted on the set of power lines.

6. The PLC device of claim 1, wherein the PLC signal leakage is detected based at least in part on one or more PLC sound packets transmitted on the set of power lines.

7. The PLC device of claim 1, wherein the precoder is used for multiple-input multiple-output (MIMO) communications on the set of power lines.

8. The PLC device of claim 1, wherein the precoder is configured to minimize PLC signal leakage from at least one PLC device or maximize PLC signal leakage from the at least one PLC device, wherein the at least one PLC device comprises the PLC device, another PLC device coupled to the set of power lines, or both.

9. A method for wireline communications, comprising:
   determining impulse noise on a set of digital subscriber line (DSL) lines, wherein the impulse noise comprises one or more power line communication (PLC) packets transmitted by a PLC device;
   determining a first PLC signal leakage corresponding to a primary coupling between a phase power line and a neutral power line and a second PLC signal leakage corresponding to an alternate coupling between the phase power line and a protective earth power line based at least in part on the one or more PLC packets; and configuring, based at least in part on the first PLC signal leakage and the second PLC signal leakage, a transmission power or a precoder of the PLC device.

10. The method of claim 9, further comprising:
identifying the one or more PLC packets as corresponding to the primary coupling, the alternate coupling, or both.

11. The method of claim 9, further comprising:
transmitting an indication to the PLC device of whether to use the primary coupling, the alternate coupling, or both for transmitting the one or more PLC packets.

12. The method of claim 9, further comprising:
determining whether precoding is used by the PLC device on the primary coupling and the alternate coupling to transmit the one or more PLC packets.

13. The method of claim 9, further comprising:
transmitting an indication to the PLC device of whether to use precoding to transmit the one or more PLC packets.

14. The method of claim 9, wherein determining the impulse noise on the set of DSL lines comprises:
measuring the impulse noise on the set of DSL lines at a DSL device separate from the PLC device.

15. The method of claim 14, wherein the DSL device is a dual sensor DSL receiver comprising a common mode (CM) port and a differential mode (DM) port, and wherein the impulse noise is detected using the CM port, the DM port, or both.

16. The method of claim 9, wherein determining the impulse noise on the set of DSL lines comprises:
receiving an indication of the impulse noise from a DSL device separate from the PLC device.

17. The method of claim 9, wherein determining the impulse noise on the set of DSL lines comprises:
measuring the impulse noise over at least one twisted pair coupled with the PLC device.

18. The method of claim 9, wherein determining the first PLC signal leakage and the second PLC signal leakage comprises:
sampling one or more PLC packets; and
the method further comprising measuring a phase and amplitude relationship for the primary coupling and the secondary coupling based on the sampled one or more PLC packets.

19. The method of claim 9, wherein determining the first PLC signal leakage and the second PLC signal leakage comprises:
decoding one or more PLC packets;
wherein the method further comprises:
determining one or more parameters for modifying the precoder based on the decoding; and
transmitting the determined one or more parameters to the PLC device.

20. The method of claim 9, wherein the precoder is from a group consisting of:
a precoder used for single-input single-output (SISO) communication between a first PLC device and a second PLC device and a precoder used for multiple-input multiple-output (MIMO) communication between the first PLC device and the second PLC device.

21. The method of claim 20, further comprising:
determining, at a frequency, a minimum power associated with the first PLC signal leakage and the second PLC signal leakage; and
selecting the precoder used for SISO communication or the precoder used for MIMO communication based at least in part on the determined minimum power.

22. The method of claim 9, wherein determining PLC leakage corresponding to the primary coupling and the alternate coupling comprises:
identifying respective transfer functions for the primary coupling and the secondary coupling.

23. The method of claim 9, wherein configuring the transmission power of the PLC device comprises:
setting an equal power backoff of the primary coupling and the alternate coupling or setting a first power backoff of the primary coupling and a second power backoff of the alternate coupling.

24. The method of claim 9, wherein configuring the transmission power of the PLC device comprises:
setting a frequency-specific power backoff of the primary coupling and the alternate coupling.

25. The method of claim 9 further comprising:
detecting a CM signal using a CM sensor and at least one sensor coupled to the set of DSL lines, or a DM signal using a DM sensor with the at least one sensor coupled to the set of DSL lines, or both.

26. The method of claim 9 further comprising:
transmitting, to an arbiter, the first PLC signal leakage, the second PLC signal leakage, or both.

27. The method of claim 9 further comprising:
configuring the precoder to minimize PLC signal leakage from at least one PLC device or maximize PLC signal leakage from the at least one PLC device, wherein the at least one PLC device comprises a PLC device coupled to a set of power lines, a PLC device coupled to the set of DSL lines, or both.

28. A non-transitory computer readable medium storing code for wireline communications, the code comprising instructions executable by a processor to:
determine impulse noise on a set of digital subscriber line (DSL) lines, wherein the impulse noise comprises one or more power line communication (PLC) packets transmitted by a PLC device;
determine a first PLC signal leakage corresponding to a primary coupling between a phase power line and a neutral power line and a second PLC signal leakage corresponding to an alternate coupling between the phase power line and a protective earth power line based at least in part on the one or more PLC packets; and
configure, based at least in part on the first PLC signal leakage and the second PLC signal leakage, a transmission power or a precoder of the PLC device.

\* \* \* \* \*